(12) United States Patent
Shimizu

(10) Patent No.: US 8,205,849 B2
(45) Date of Patent: Jun. 26, 2012

(54) DISPLAY SCREEN TURNING APPARATUS AND TELEVISION SET

(75) Inventor: Daisuke Shimizu, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 344 days.

(21) Appl. No.: 12/396,742

(22) Filed: Mar. 3, 2009

(65) Prior Publication Data

US 2009/0266946 A1 Oct. 29, 2009

(30) Foreign Application Priority Data

Apr. 23, 2008 (JP) ................................ 2008-112250

(51) Int. Cl.
*A47G 29/00* (2006.01)

(52) U.S. Cl. .................... 248/371; 248/176.2; 248/917; 248/919; 248/923

(58) Field of Classification Search .......... 248/917–923, 248/131, 371, 176.1; 361/679.01
See application file for complete search history.

(56) References Cited

U.S. PATENT DOCUMENTS

| | | | | |
|---|---|---|---|---|
| 3,069,339 A | * | 12/1962 | Jacobs | 376/253 |
| 5,724,704 A | | 3/1998 | Seo | |
| 7,382,419 B2 | | 6/2008 | Kato | |
| 7,874,537 B2 | * | 1/2011 | Kameoka et al. | 248/349.1 |
| 2003/0174259 A1 | | 9/2003 | Yang | |
| 2007/0215761 A1 | | 9/2007 | Sawai et al. | |
| 2007/0252066 A1 | | 11/2007 | Iwai et al. | |

FOREIGN PATENT DOCUMENTS

| | | |
|---|---|---|
| DE | 202 13 741 U1 | 2/2003 |
| EP | 0 163 788 A1 | 12/1985 |
| EP | 1 892 454 A1 | 2/2008 |
| JP | 3106183 U | 10/2004 |
| JP | 2005-28371 A | 2/2005 |
| JP | 2006-3737 A | 1/2006 |
| JP | 2007-248542 A | 9/2007 |
| JP | 2007-293151 A | 11/2007 |

OTHER PUBLICATIONS

Extended European Search Report dated Dec. 10, 2009 (Five (5) pages).
Japanese Office Action dated Feb. 9, 2010 with English translation (four (4) pages).

* cited by examiner

*Primary Examiner* — Amy J. Sterling
(74) *Attorney, Agent, or Firm* — Crowell & Moring LLP

(57) ABSTRACT

This display screen turning apparatus includes a first support member of metal supporting a display screen portion and a second support member of metal supporting the first support member to be anteroposteriorly rotatable by a prescribed angle with respect to a vertical plane, and either the first support member or the second support member has a receiving hole, while either the second support member or the first support member integrally has a platelike support shaft of metal inserted into the receiving hole.

18 Claims, 14 Drawing Sheets

DISPLAY SCREEN TURNING APPARATUS AND TELEVISION SET

BACKGROUND OF THE INVENTION

1. Field of the Invention

The present invention relates to a display screen turning apparatus and a television set, and more particularly, it relates to a display screen turning apparatus and a television set each supporting a display screen portion to be anteroposteriorly rotatable by a prescribed angle with respect to a vertical plane.

2. Description of the Background Art

A display screen turning apparatus comprising a display screen support member supporting a display screen portion of a liquid crystal television or the like to be anteroposteriorly rotatable by a prescribed angle with respect to a vertical plane is known in general, as disclosed in each of Japanese Patent Laying Open Nos. 2007-293151 and 2006-3737 and Japanese Utility Model Registration No. 3106183, for example.

The aforementioned Japanese Patent Laying Open No. 2007-293151 discloses a display comprising a display portion (display screen portion), a stand fixing plate (second support member) provided with a hole (receiving hole) and a display portion fixing plate (first support plate) mounted with a round shaft having a locking shaft inserted into the hole for supporting the display portion. In the display described in Japanese Patent Laying Open No. 2007-293151, the locking shaft inserted into the hole comes off when the shaft is pressed so that the display portion fixing plate is rotatable around the shaft, thereby rendering the display portion anteroposteriorly rotatable by a prescribed angle with respect to a vertical plane.

The aforementioned Japanese Patent Laying Open No. 2006-3737 discloses a display support apparatus (display screen turning apparatus) comprising a support leg portion (first support member) provided with a round shaft portion for supporting a display screen portion to be anteroposteriorly rotatable by a prescribed angle with respect to a vertical plane, a base (second support member) provided with a pair of shaft support portions and a cover member so provided as to come into contact with the support leg portion when the support leg portion is in a vertical state for preventing the display screen portion from rotating frontward from the vertical plane. The shaft portion and the support leg portion are integrally molded by synthetic resin, while the shaft support portions and the base are also integrally molded by synthetic resin. In the display support apparatus described in Japanese Patent Laying Open No. 2006-3737, the shaft portion is so rotated around the shaft support portions as to support the display screen portion to be rotatable rearward by a prescribed angle with respect to the vertical plane. Further, the display support apparatus described in Japanese Patent Laying Open No. 2006-3737 is so formed as not to rotate the display screen portion frontward from the vertical plane with the cover member.

The aforementioned Japanese Utility Model Registration No. 3106183 discloses a liquid crystal television comprising a body-side bracket (first support member) having a through-hole (receiving hole) for supporting a television body portion (display screen portion), a stand-side bracket (second support member) having a through-hole (receiving hole) for rotatably supporting the body-side bracket, bolts in the form of round shafts passing through the through-holes respectively thereby rotatably fixing the body-side bracket and the stand-side bracket and nuts meshing with the bolts. In the liquid crystal television described in Japanese Utility Model Registration No. 3106183, the body-side bracket is rotated around the round bolts passing through the through-holes respectively, thereby supporting the television body portion to be anteroposteriorly rotatable by a prescribed angle with respect to a vertical plane.

In the display described in the aforementioned Japanese Patent Laying Open No. 2007-293151, however, the shaft must be provided independently of the display portion fixing plate and the stand fixing plate, in order to render the display portion anteroposteriorly rotatable by the prescribed angle with respect to the vertical plane. Therefore, the number of components is disadvantageously increased.

In the display support apparatus disclosed in the aforementioned Japanese Patent Laying Open No. 2006-3737, the cover member prevents the display screen portion from rotating frontward from the vertical plane, and hence the display screen portion cannot be rotated frontward from the vertical plane. Further, synthetic resin is generally inferior in mechanical strength. When the display screen portion and the display support apparatus are increased in size, therefore, the display support member may conceivably be broken.

In the liquid crystal television described in the aforementioned Japanese Utility Model Registration No. 3106183, the bolts and the nuts must be provided independently of the body-side bracket and the stand-side bracket, in order to render the television body portion anteroposteriorly rotatable by the prescribed angle with respect to the vertical plane. Therefore, the number of components is disadvantageously increased.

SUMMARY OF THE INVENTION

The present invention has been proposed in order to solve the aforementioned problems, and an object of the present invention is to provide a display screen turning apparatus capable of anteroposteriorly rotating a display screen portion by a prescribed angle with respect to a vertical plane while preventing the apparatus body from breakage and suppressing increase in the number of components.

A display screen turning apparatus according to a first aspect of the present invention comprises a first support member of metal supporting a display screen portion and a second support member of metal supporting the first support member to be anteroposteriorly rotatable by a prescribed angle with respect to a vertical plane, and either the first support member or the second support member has a receiving hole, while either the second support member or the first support member integrally has a platelike support shaft of metal inserted into the receiving hole.

In the display screen turning apparatus according to the first aspect, as hereinabove described, either the first support member or the second support member has the receiving hole while either the second support member or the first support member has the platelike support shaft inserted into the receiving hole so that the first support member can be anteroposteriorly rotated around the platelike support shaft inserted into the receiving hole by a prescribed angle with respect to the second support member, whereby the display screen portion can be anteroposteriorly rotated by the prescribed angle with respect to the vertical plane. Further, the first support member, the second support member and the support shaft are so made of metal that the same can be improved in mechanical strength as compared with a case where the first support member, the second support member and the support shaft are made of resin, whereby the apparatus body can be prevented from breakage when the display screen portion and the display screen turning apparatus are increased in size. In addition, either the second support member or the first support member so integrally has the platelike support shaft that no support shaft may be separately provided for anteroposteriorly rotating the display screen portion by the prescribed angle with respect to the vertical plane, whereby increase in the number of components can be suppressed.

In the aforementioned display screen turning apparatus according to the first aspect, either the first support member or the second support member preferably integrally has a stop portion for inhibiting the support shaft from coming off the receiving hole in the anteroposterior rotational range of the first support member with respect to the vertical plane in the used state of the apparatus when the support shaft is inserted into the receiving hole. According to this structure, the stop portion for inhibiting the support shaft from coming off the receiving hole is so provided that the first support member and the second support member can be inhibited from disengagement when the first support member is anteroposteriorly rotated with respect to the vertical plane. Further, either the first support member or the second support member so integrally has the stop portion that no stop portion may be separately provided on either the first support member or the second support member for inhibiting the support shaft from coming off the receiving hole, whereby increase in the number of components can be suppressed.

In this case, the first support member preferably has the receiving hole and the second support member preferably integrally has the support shaft and the stop portion, and the second support member is disengaged from the first support member when the first support member is rotated beyond the anteroposterior rotational range of the first support member with respect to the vertical plane in the used state of the apparatus. According to this structure, the second support member can be kept in engagement with the first support member in the used state of the apparatus, while the second support member can be mounted on or detached from the first support member by rotating the first support member beyond the rotational range of the first support member with respect to the vertical plane in the used state of the apparatus when the second support member is mounted on or detached from the first support member.

In the aforementioned display screen turning apparatus provided with the second support member having the support shaft and the stop portion, the second support member is preferably made of sheet metal, and the support shaft and the stop portion are preferably integrally formed on the second support member by folding. According to this structure, the second support member having the support shaft and the stop portion can be easily obtained by general sheet metal working.

In the aforementioned display screen turning apparatus so formed as to disengage the second support member from the first support member, the stop portion preferably consists of a first stop portion and a second stop portion, and the first support member preferably further has a notched portion for separating the first stop portion from the first support member when rotated up to a position where the second support member is disengaged from the first support member. According to this structure, the first stop portion of the second support member can be easily separated from the first support member through the notched portion of the first support member when detaching the second support member from the first support member, whereby the second support member can be more easily detached from the first support member.

In the aforementioned display screen turning apparatus provided with the stop portion consisting of the first stop portion and the second stop portion, the first support member preferably further has a stop section stopped by the second stop portion, and the second stop portion preferably stops the stop section in the anteroposterior rotational range of the first support member with respect to the vertical plane in the used state of the apparatus. According to this structure, the stop section is so stopped by the second stop portion that the support shaft can be more inhibited from coming off the receiving hole, whereby the first support member and the second support member can be more inhibited from disengagement when the first support member is anteroposteriorly rotated with respect to the vertical plane.

The aforementioned display screen turning apparatus provided with the first support member having the stop section is preferably so formed as to disengage the stop section and the second stop portion from each other when rotating the first support member beyond the anteroposterior rotational range of the first support member with respect to the vertical plane in the used state of the apparatus. According to this structure, the second stop portion can be inhibited from causing difficulty in disengagement of the second support member and the first support member when the second support member is detached from the first support member.

In the aforementioned display screen turning apparatus provided with the first support member having the stop section, the first support member is preferably made of sheet metal, and the stop section is preferably integrally formed on the first support member. According to this structure, the first support member having the stop section can be easily obtained by general sheet metal working.

In the aforementioned display screen turning apparatus provided with the stop portion consisting of the first stop portion and the second stop portion, the first stop portion preferably has a stop section extending toward the support shaft, the notched portion is preferably so formed as to extend toward the receiving hole, and the stop section is preferably so formed as to stop the first support member in the anteroposterior rotational range of the first support member with respect to the vertical plane in the used state of the apparatus when the support shaft is inserted into the receiving hole and to be separable from the notched portion when the first support member is rotated up to a position where the second support member is disengaged from the first support member. According to this structure, the stop section can more stably stop the first support member, whereby the first support member and the second support member can be reliably prevented from disengagement when the first support member is anteroposteriorly rotated with respect to the vertical plane. Further, the stop section can be separated from the notched portion in the state where the first support member and the second support member can be disengaged from each other, whereby the first support member can be more easily detached from the second support member.

The aforementioned display screen turning apparatus provided with the first support member having the stop section is preferably so formed that the first stop portion stops the first support member and the second stop portion stops the stop section in the anteroposterior rotational range of the first support member with respect to the vertical plane in the used state of the apparatus when the support shaft is inserted into the receiving hole. According to this structure, the first stop portion stops the first support member while the second stop portion stops the stop section of the first support member, whereby the support shaft can be more inhibited from coming off the receiving hole. Thus, the first support member and the second support member can be more inhibited from disengagement when the first support member is anteroposteriorly rotated with respect to the vertical plane.

In the aforementioned display screen turning apparatus provided with the first stop portion stopping the first support member and the second stop portion stopping the stop section thereby inhibiting the support shaft from coming off the receiving hole, the second support member preferably further has a body portion provided with the support shaft on a substantially central portion and provided with the first stop portion and the second stop portion on the side surface, and the first support member is preferably rotatably supported in a state held between the first and second stop portions and the body portion. According to this structure, the first support member is supported by the second support member in the state held between the first and second stop portions and the body portion, whereby the first and second support members can be further inhibited from backlash in the used state of the apparatus.

In the aforementioned display screen turning apparatus provided with the first support member having the receiving hole and the second support member integrally having the support shaft and the stop portion, the platelike support shaft is preferably so formed on the second support member as to vertically extend, while the receiving hole of the first support member is preferably so formed as to substantially vertically receive a platelikely extending surface of the platelike support shaft, and the upper surface of the support shaft is preferably so formed as to come into contact with the bottom portion of the receiving hole in the anteroposterior rotational range of the first support member with respect to the vertical plane in the used state of the apparatus. According to this structure, the upper surface of the support shaft can receive the load of the first support member upon rotation thereof, thereby preventing the platelikely extending surface of the support shaft from application of the load of the first support member through the inner surface of the receiving hole. Thus, the support shaft can be prevented from breakage.

In the aforementioned display screen turning apparatus so formed as to disengage the second support member from the first support member, the receiving hole preferably has a sectoral shape, and the first support member is preferably so formed that the second support member is disengaged from the first support member when a platelikely extending surface of the support shaft comes into contact with at least one side surface of the receiving hole. According to this structure, the first support member and the second support member can be disengaged from each other at such an angle that at least one side surface of the sectoral receiving hole and the platelikely extending surface of the support shaft are in contact with each other, whereby the position for disengaging the first and second support members from each other can be clarified dissimilarly to a case of disengaging the first and second support members from each other at an angle other than the angle at which one side surface of the sectoral receiving hole and the platelikely extending surface of the support shaft are in contact with each other. Thus, the first support member can be easily detached from the second support member.

In the aforementioned display screen turning apparatus provided with the first support member having the receiving hole and the second support member integrally having the support shaft and the stop portion, a platelikely extending surface of the support shaft of the second support member is preferably so formed as not to come into contact with the side surface of the receiving hole of the first support member in the anteroposterior rotational range of the first support member with respect to the vertical plane in the used state of the apparatus. According to this structure, the platelikely extending surface of the support shaft of the second support member can be prevented from application of force resulting from contact with the side surface of the receiving hole of the first support member, whereby the support shaft can be prevented from breakage.

In the aforementioned display screen turning apparatus provided with the platelike support shaft so formed on the second support member as to vertically extend, the second support member is preferably fixed in a state where the platelike support shaft vertically extends. According to this structure, the platelike support shaft can be regularly fixed in the vertically extending state, whereby the upper surface of the support shaft can more reliably receive the load of the first support member upon rotation thereof. Thus, the platelikely extending surface of the support shaft can be more prevented from application of the load of the first support member through the inner surface of the receiving hole.

A television set according to a second aspect of the present invention comprises a display screen portion displaying a television image, a first support member of metal supporting the display screen portion and a second support member of metal supporting the first support member to be anteroposteriorly rotatable by a prescribed angle with respect to a vertical plane, and either the first support member or the second support member has a receiving hole, while either the second support member or the first support member integrally has a platelike support shaft of metal inserted into the receiving hole.

In the television set according to the second aspect of the present invention, as hereinabove described, either the first support member or the second support member has the receiving hole while either the second support member or the first support member has the platelike support shaft inserted into the receiving hole so that the first support member can be anteroposteriorly rotated around the platelike support shaft inserted into the receiving hole by a prescribed angle with respect to the second support member, whereby the display screen portion can be anteroposteriorly rotated by the prescribed angle with respect to the vertical plane. Further, the first support member, the second support member and the support shaft are so made of metal that the same can be improved in mechanical strength as compared with a case where the first support member, the second support member and the support shaft are made of resin, whereby the apparatus body can be prevented from breakage when the television set are increased in size. In addition, either the second support member or the first support member so integrally has the platelike support shaft that no support shaft may be separately provided for anteroposteriorly rotating the display screen portion by the prescribed angle with respect to the vertical plane, whereby increase in the number of components can be suppressed.

In the aforementioned television set according to the second aspect, either the first support member or the second support member integrally has a stop portion for inhibiting the support shaft from coming off the receiving hole in the anteroposterior rotational range of the first support member with respect to the vertical plane in the used state of the apparatus when the support shaft is inserted into the receiving hole. According to this structure, the stop portion for inhibiting the support shaft from coming off the receiving hole is so provided that the first support member and the second support member can be inhibited from disengagement when the first support member is anteroposteriorly rotated with respect to the vertical plane. Further, either the first support member or the second support member so integrally has the stop portion that no stop portion may be separately provided on either the first support member or the second support member for inhibiting the support shaft from coming off the receiving hole, whereby increase in the number of components can be suppressed.

In this case, the first support member preferably has the receiving hole and the second support member preferably integrally has the support shaft and the stop portion, and the second support member is disengaged from the first support member when the first support member is rotated beyond the anteroposterior rotational range of the first support member with respect to the vertical plane in the used state of the apparatus. According to this structure, the second support member can be kept in engagement with the first support member in the used state of the apparatus, while the second support member can be mounted on or detached from the first support member by rotating the first support member beyond the rotational range of the first support member with respect to the vertical plane in the used state of the apparatus when the second support member is mounted on or detached from the first support member.

In the aforementioned television set provided with the second support member having the support shaft and the stop portion, the second support member is preferably made of sheet metal, and the support shaft and the stop portion are preferably integrally formed on the second support member by folding. According to this structure, the second support member having the support shaft and the stop portion can be easily obtained by general sheet metal working.

In the aforementioned television set so formed as to disengage the second support member from the first support member, the stop portion preferably consists of a first stop portion and a second stop portion, and the first support member preferably further has a notched portion for separating the first stop portion from the first support member when rotated up to a position where the second support member is disengaged from the first support member. According to this structure, the first stop portion of the second support member can be easily separated from the first support member through the notched portion of the first support member when detaching the second support member from the first support member, whereby the second support member can be more easily detached from the first support member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a display screen turning apparatus 20 according to the embodiment of the present invention is described with reference to FIGS. 1 to 13. This embodiment of the present invention is applied to the display screen turning apparatus 20 supporting a liquid crystal television 100 employed as an exemplary television set.

Figure 1:
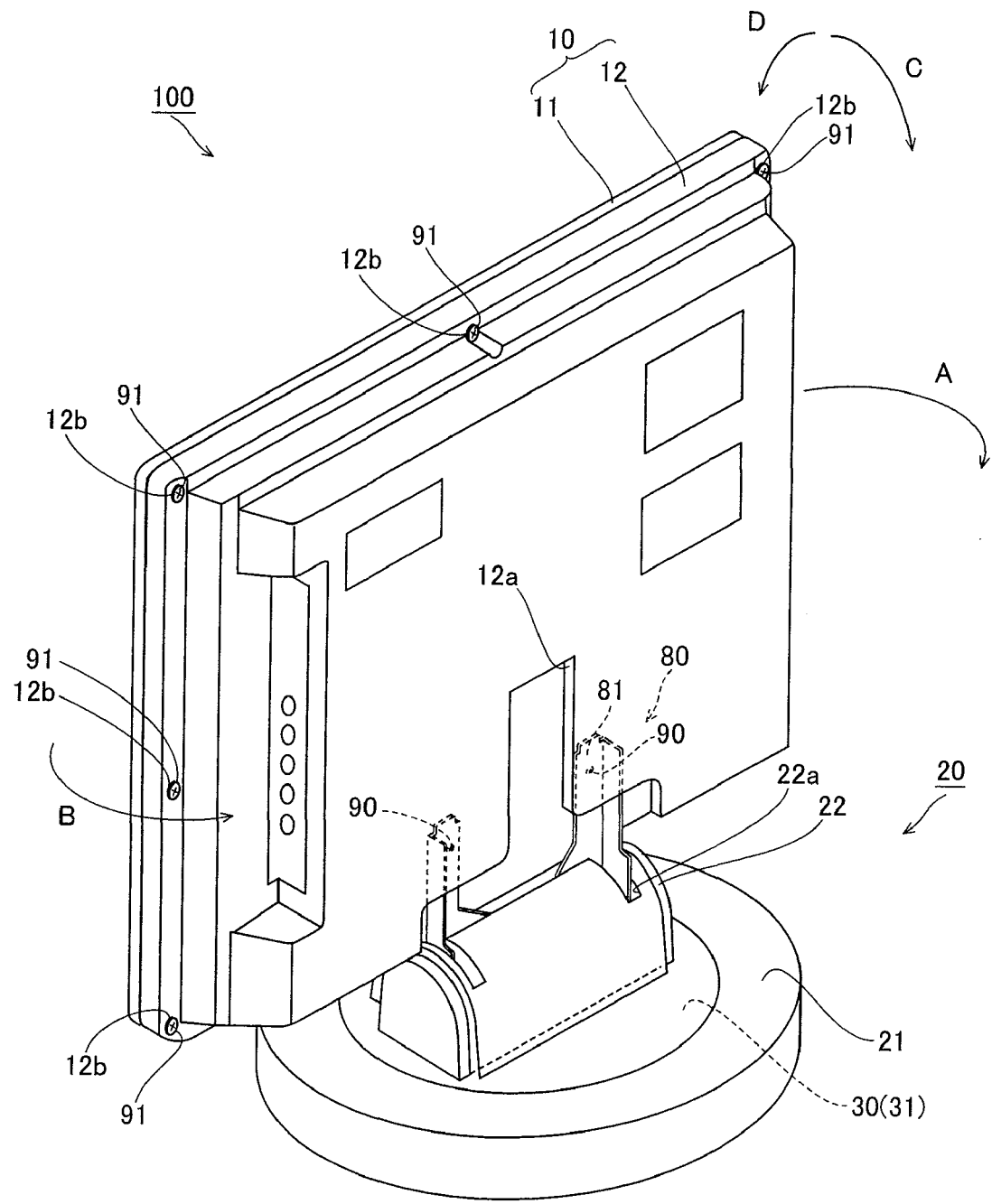
FIG. 1 is a perspective view showing the overall structure of a liquid crystal television provided with a display screen turning apparatus according to an embodiment of the present invention.

The display screen turning apparatus 20 according to the embodiment of the present invention is so provided as to render a display body 10, supported by a display screen support mechanism 80, of the liquid crystal television 100 horizontally turnable (along arrows A and B) by a prescribed angle in a horizontal plane and anteroposteriorly inclinable (along arrows C and D) by a prescribed angle with respect to a vertical plane, as shown in FIG. 1. The display body 10 is an example of the "display screen portion" in the present invention.

Figure 2:
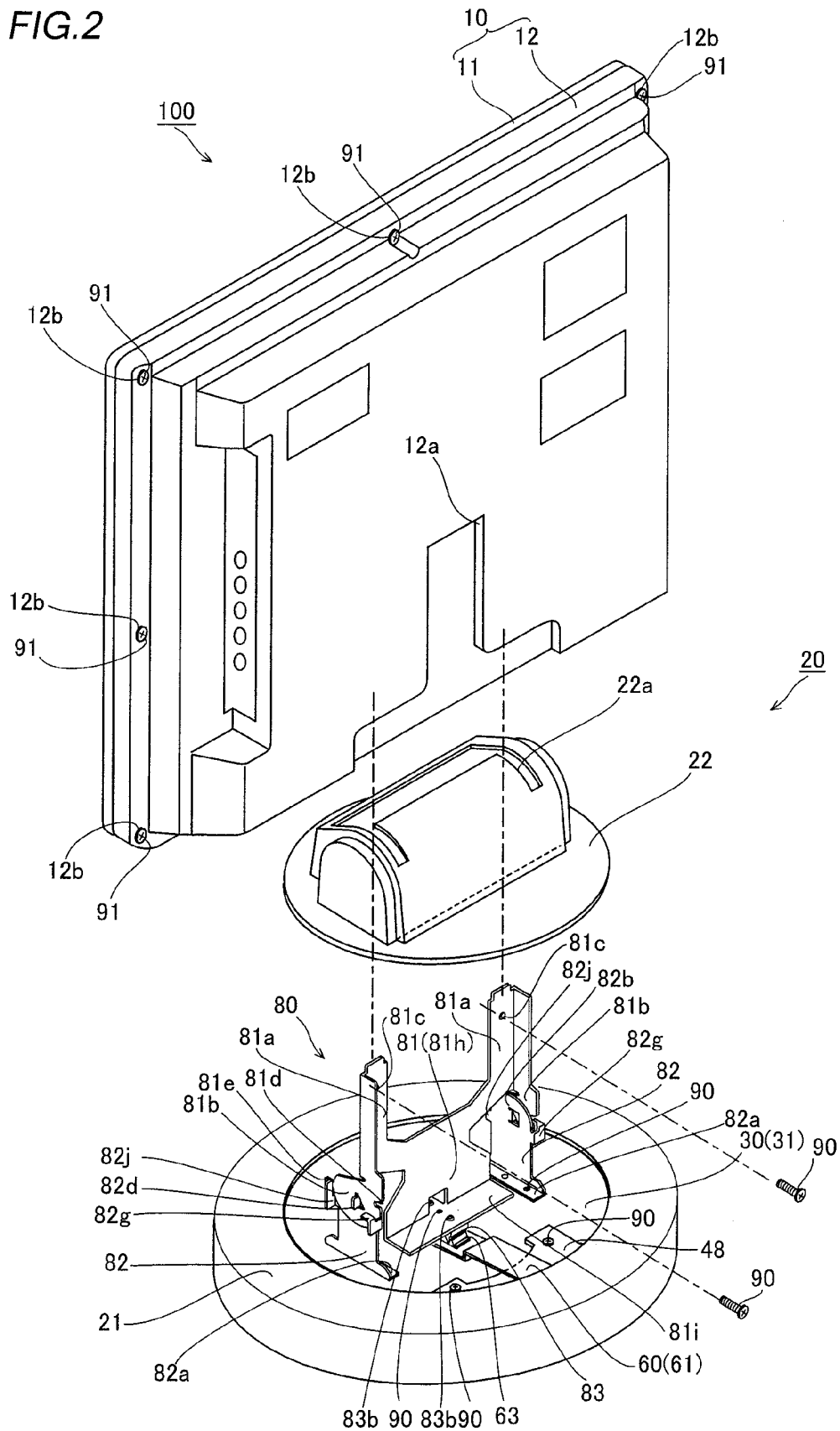
FIG. 2 is an exploded perspective view of the liquid crystal television provided with the display screen turning apparatus according to the embodiment of the present invention shown in FIG. 1.
Figure 3:
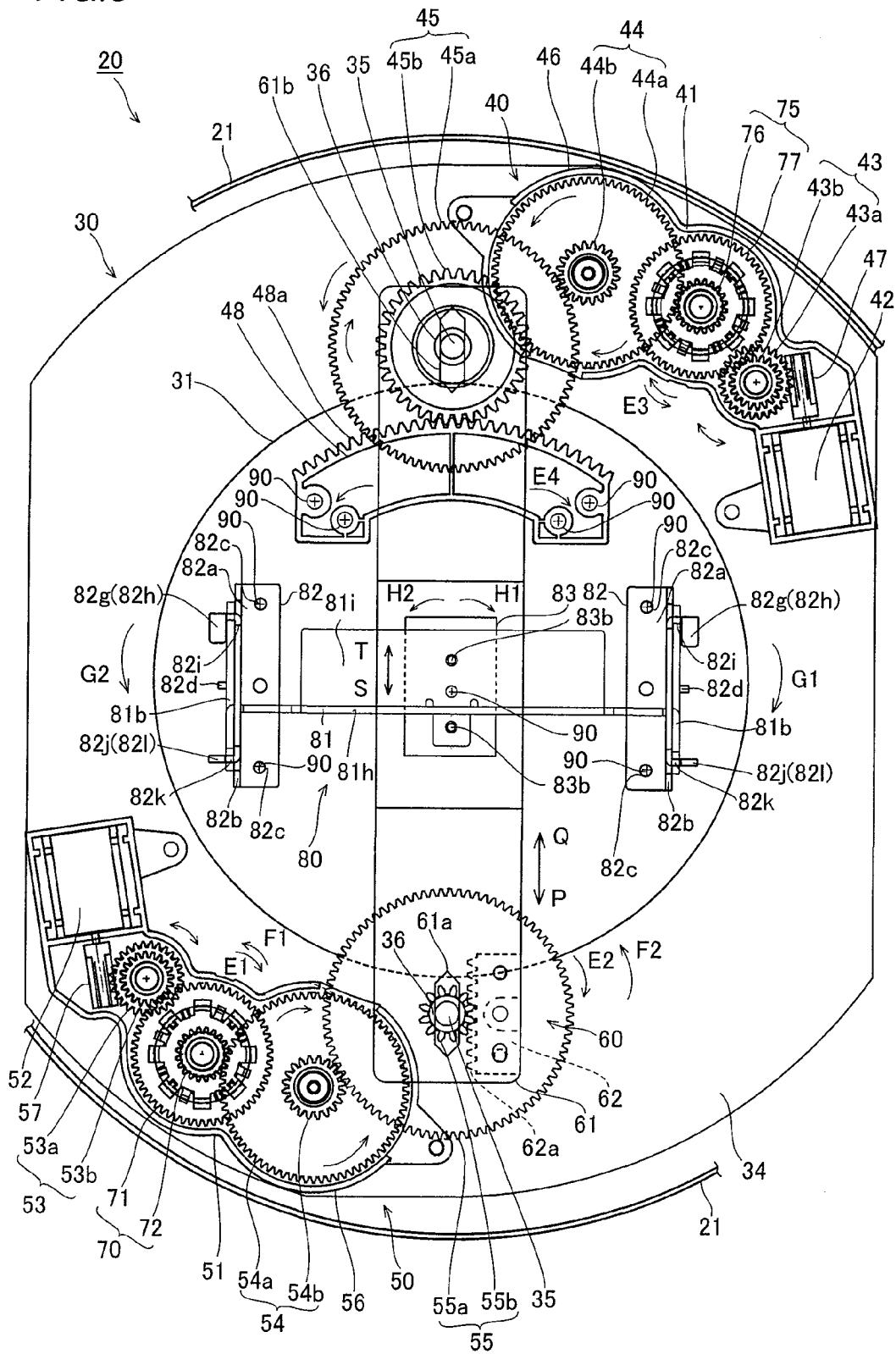
FIG. 3 is a plan view of the display screen turning apparatus according to the embodiment of the present invention shown in FIG. 1.

As shown in FIG. 3, the display screen turning apparatus 20 is constituted of the display screen support mechanism 80 supporting the display body 10 (see FIG. 2), a base portion 30 for horizontally turning the display body 10 (see FIG. 2) supported by the display screen support mechanism 80 in the horizontal plane (along arrows A and B in FIG. 1), a horizontal turning/driving portion 40 horizontally turning a turntable 31, described later, arranged on the base portion 30 while controlling the turning angle of the turntable 31, and a vertical turning/driving portion 50 anteroposteriorly turning the display body 10 supported by the display screen support mechanism 80 by a prescribed angle with respect to a vertical plane (along arrows C and D in FIG. 1) while controlling the turning angle of the display screen support mechanism 80.

Figure 4:
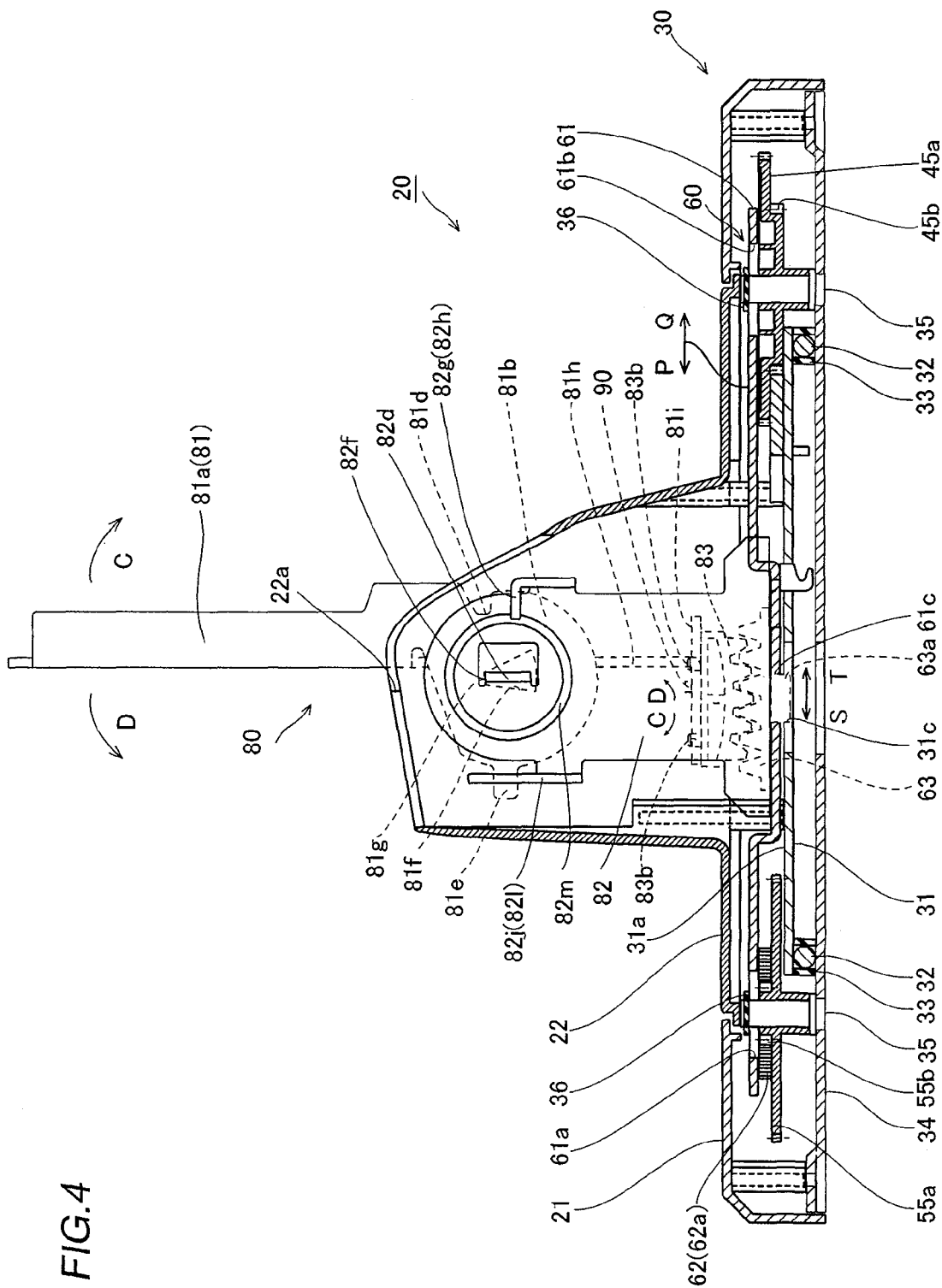
FIG. 4 is a sectional view for illustrating the structure of the display screen turning apparatus according to the embodiment of the present invention shown in FIG. 1.
Figure 5:
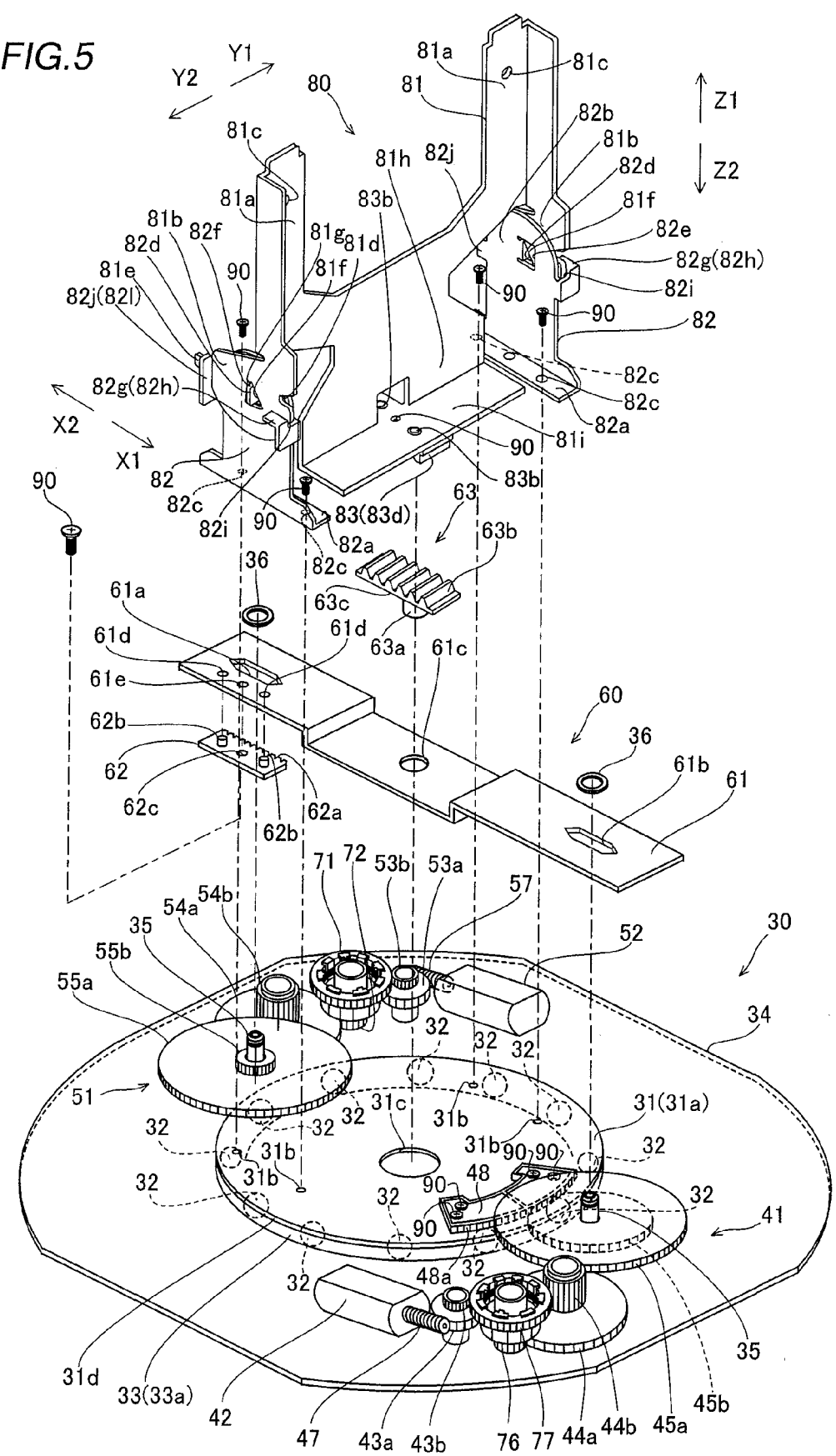
FIG. 5 is an exploded perspective view showing the detailed structure of the display screen turning apparatus according to the embodiment of the present invention shown in FIG. 1.

As shown in FIGS. 4 and 5, the display screen support mechanism 80 is constituted of a display screen support member 81 of sheet metal, a pair of vertical support members 82 of sheet metal and a rotational gear 83 of resin so arranged as to mesh with a rack gear 63 (see FIG. 4) of a rack plate 60 described later. The display screen support member 81 and the vertical support members 82 are examples of the "first support member" and the "second support member" in the present invention respectively. The display screen support member 81 is so mounted on the pair of vertical support members 82 as to be rotatable with torque exceeding a prescribed level.

Figure 8:
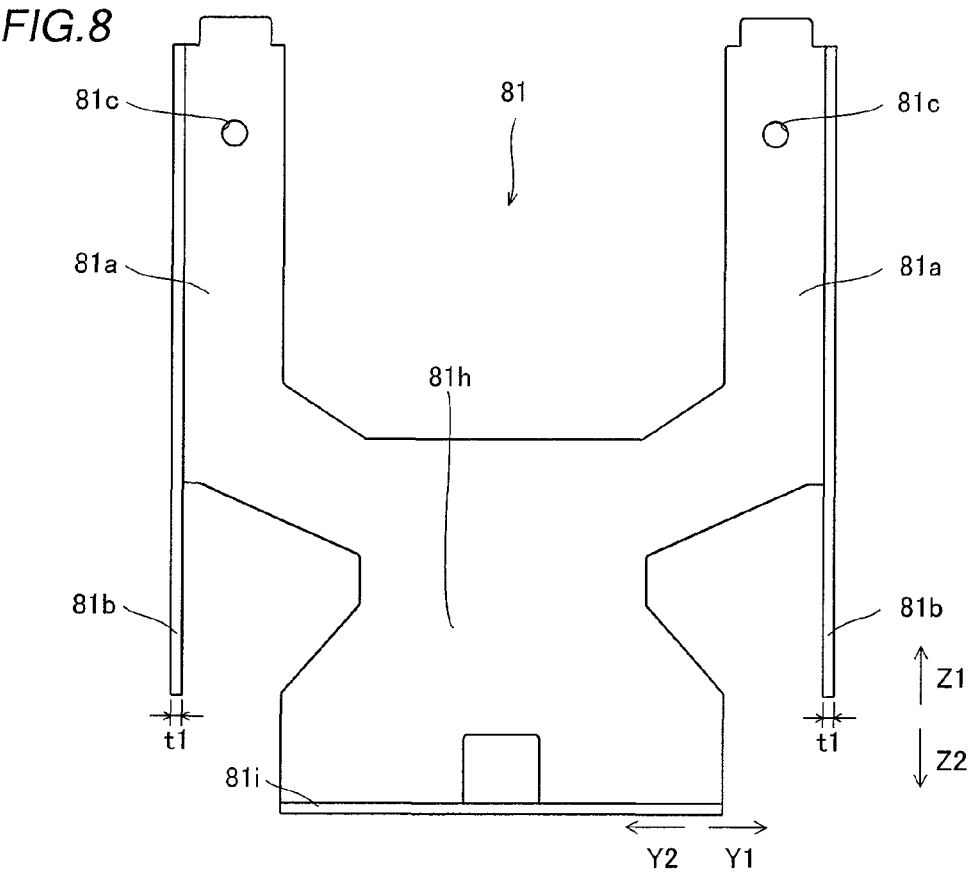
FIG. 8 is a front elevational view of the display screen support member according to the embodiment of the present invention, as viewed along arrow X1 in FIG. 6.

As shown in FIG. 8, the display screen support member 81 integrally includes a pair of display body mounting portions 81a so provided as to extend upward (along arrow Z1) and a pair of rotational portions 81b provided on side surfaces of the display screen support member 81 along arrows Y1 and Y2 respectively. The pair of display body mounting portions 81a are provided with screw receiving holes 81c respectively.

According to this embodiment, the pair of rotational portions 81b of the display screen support member 81 are so provided as to vertically extend (along arrows X1 and X2) with respect to the display body mounting portions 81a from both side end portions of the display body mounting portions 81a respectively. The rotational portions 81b have a thickness t1 (see FIG. 8) along arrows Y1 and Y2. Further, notched portions 81d concaved toward the direction (along arrow X2) of hole portions 81f described later are provided on the pair of rotational portions 81b along arrow X1 respectively, as shown in FIG. 7.

In addition, protrusions 81e convexed along arrow X2 are integrally formed on the pair of rotational portions 81b along arrow X2 respectively. These protrusions 81e are stopped by stop portions 821, described later, of hooks 82j, described later, when support shafts 82d, described later, of rotational portion mounting portions 82b are inserted into hole portions 81f, described later, of the display screen support member 81. The protrusions 81e are examples of the "stop section" in the present invention.

Figure 6:
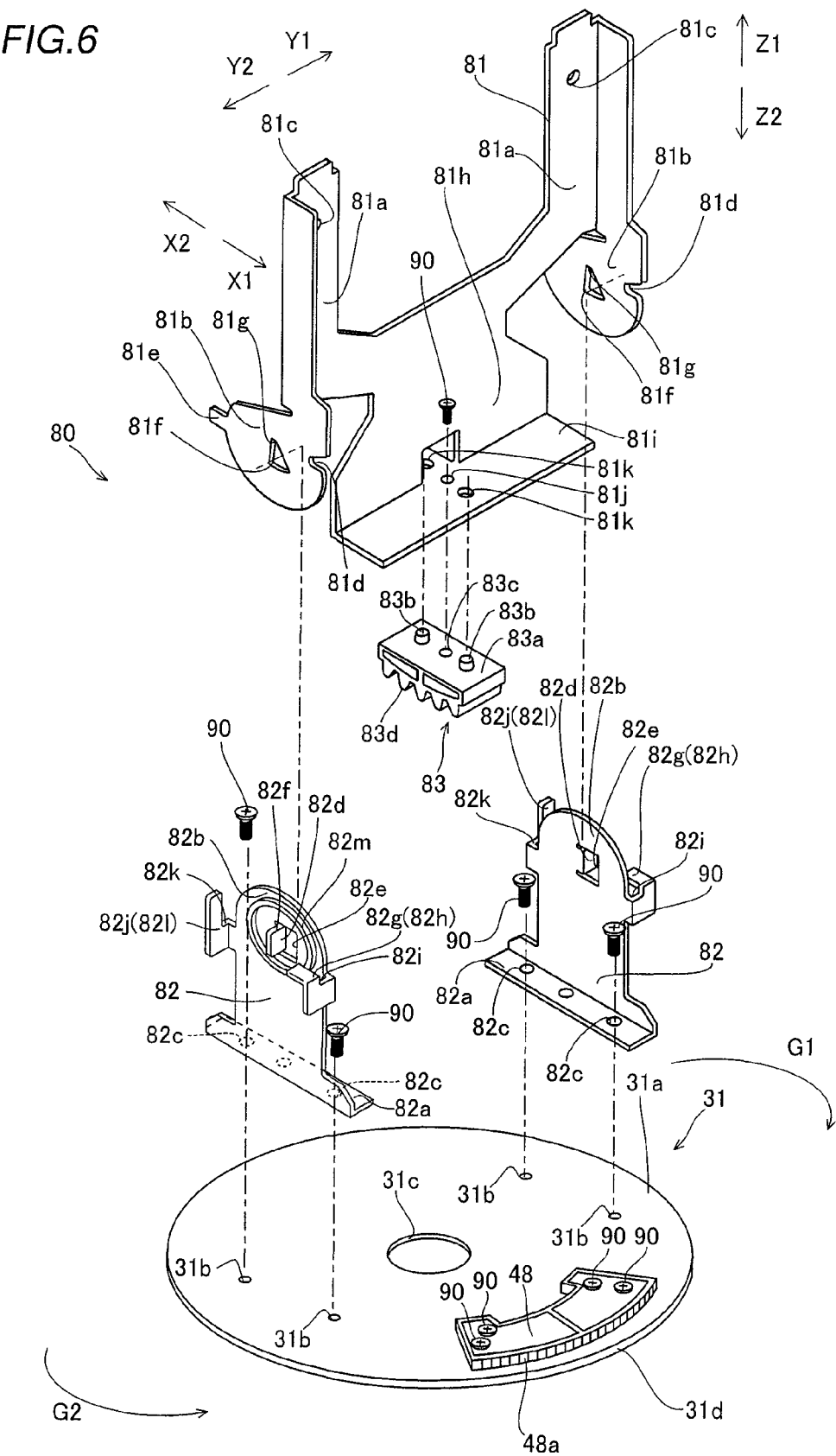
FIG. 6 is an exploded perspective view for illustrating the detailed structures of a display screen support mechanism and a turntable according to the embodiment of the present invention.
Figure 7:
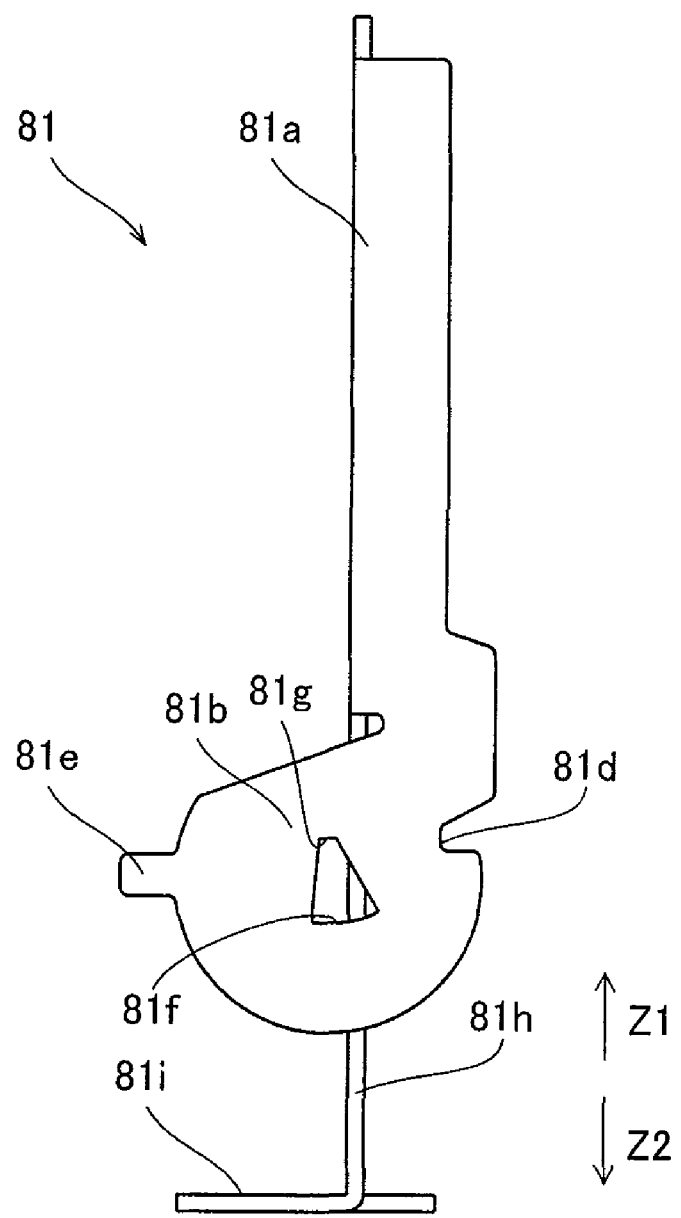
FIG. 7 is a side elevational view of a display screen support member according to the embodiment of the present invention, as viewed along arrow Y2 in FIG. 6.

According to this embodiment, sectoral hole portions 81f are formed in the vicinity of the rotation centers of the pair of rotational portions 81b to be held between the notched portions 81d and the protrusions 81e, as shown in FIGS. 4 to 7. The hole portions 81f are examples of the "receiving hole" in the present invention. The sectoral hole portions 81f are so provided as to receive the support shafts 82d described later, as shown in FIGS. 4 to 6. Each sectoral hole portion 81f is so arranged that a bottom portion 81g closer to the center of a circle is positioned upward as shown in FIG. 7, while the bottom portion 81g closer to the center of the circle is brought into contact with an upper surface 82f, described later, of the corresponding support shaft 82d, as shown in FIG. 4. Thus, the bottom portions 81g of the sectoral hole portions 81f receive the vertical load of the display body 10 (see FIG. 2) through the display screen support member 81. The display screen support member 81 is rotatable around the bottom portions 81g of the sectoral hole portions 81f supported by the platelike support shafts 82d in a sectoral angular range with respect to the support shafts 82d.

As shown in FIGS. 6 and 8, the display screen support member 81 is integrally provided with a body portion 81h so provided as to extend downward (along arrow Z2) from the display body mounting portions 81a. On the lower end of the body portion 81h, a lower surface portion 81i is so provided as to vertically extend (along arrows X1 and X2) with respect to the body portion 81h. This lower surface portion 81i is formed integrally with the body portion 81h. As shown in FIG. 6, a screw receiving hole 81j receiving a screw 90 for fixing a rotational gear 83 and the display screen support member 81 to each other is formed at the center of the lower surface portion 81i. Further, a pair of boss receiving holes 81k are formed on the lower surface portion 81i along arrows X1 and X2 respectively, to hold the screw receiving hole 81j therebetween. A pair of bosses 83b, described later, of the rotational gear 83 are inserted into the pair of boss receiving holes 81k respectively.

As shown in FIG. 5, the pair of vertical support members 82 are so arranged that the support shafts 82d described later are inserted into the hole portions 81f of the display screen support member 81 outward from the inner side of the display screen support member 81. More specifically, the vertical support member 82 mounted on the rotational portion 81b of the display screen support member 81 provided along arrow Y1 is so arranged as to come into contact with the surface, extending along arrow Y2, of the rotational portion 81b of the display screen support member 81 provided along arrow Y1. On the other hand, the vertical support member 82 mounted on the rotational portion 81b of the display screen support member 81 provided along arrow Y2 is so arranged as to come into contact with the surface, extending along arrow Y1, of the rotational portion 81b of the display screen support member 81 provided along arrow Y2.

The pair of vertical support members 82 are mirror-symmetrical to each other, as shown in FIG. 6. Therefore, the vertical support member 82 mounted on the rotational portion 81b of the display screen support member 81 provided along arrow Y2 is now described.

Figure 9:
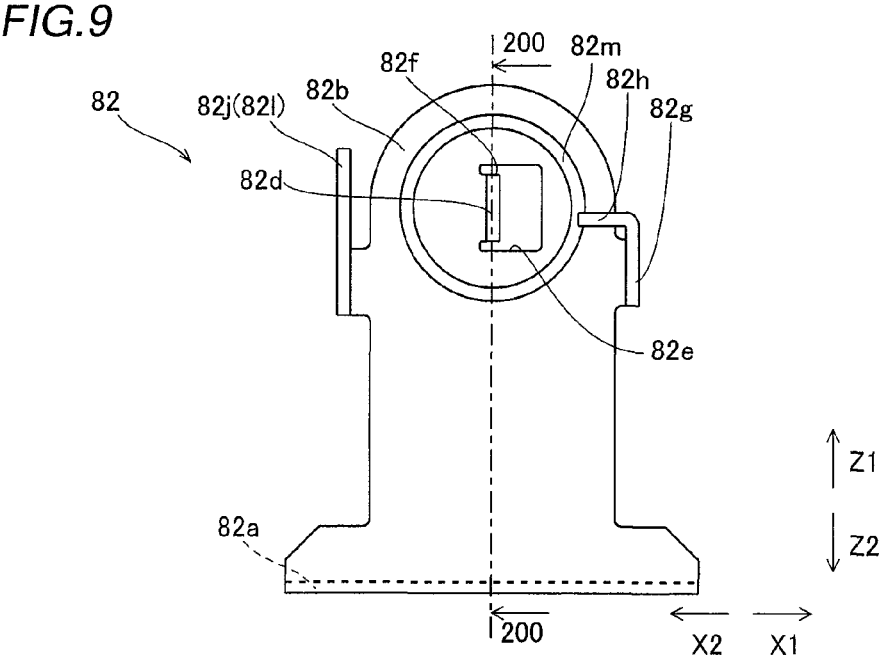
FIG. 9 is a front elevational view of a vertical support member mounted on a rotating portion, along arrow Y2 in FIG. 6, of the display screen support member according to the embodiment of the present invention, as viewed along arrow Y2.
Figure 10:
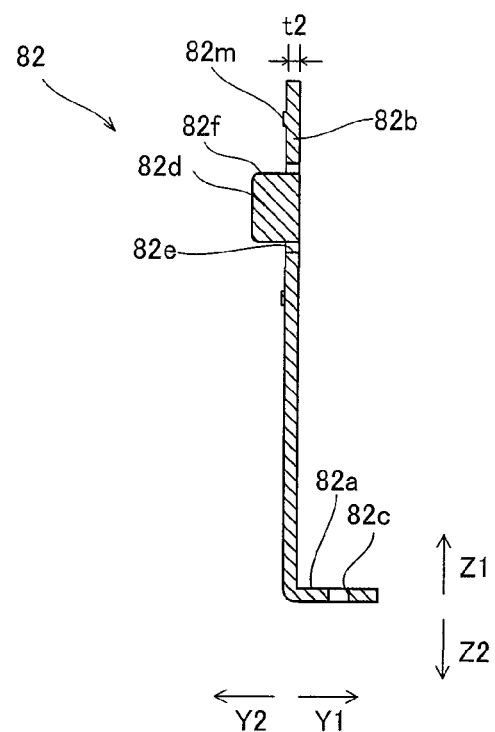
FIG. 10 is a sectional view of the vertical support member according to the embodiment of the present invention taken along the line 200-200 in FIG. 9.

This vertical support member 82 includes a turntable mounting portion 82a and the corresponding rotational portion mounting portion 82b, as shown in FIGS. 6 and 9. The turntable mounting portion 82a of the vertical support member 82 is so provided on the lower portion of the vertical support member 82 as to extend along arrow Y1 as shown in FIGS. 6 and 10, and screw mounting holes 82c for fixing the vertical support member 82 to the turntable 31 are formed on the turntable mounting portion 82a. Thus, the vertical support member 82 is fixed to the turntable 31 in a state where the corresponding support shaft 82d described later vertically extends (along arrows Z1 and Z2). The rotational portion mounting portion 82b of the vertical support member 82 is so provided as to vertically extend upward (along arrow Z1) with respect to the turntable mounting portion 82a from an end portion of the turntable mounting portion 82a provided along arrow Y2. As shown in FIG. 10, the rotational portion mounting portion 82b has a thickness t2 along arrows Y1 and Y2. The rotational portion mounting portion 82b is an example of the "body portion" in the present invention.

According to this embodiment, the upper portion of the rotational portion mounting portion 82b is semicircular, as shown in FIG. 9. In the vicinity of the center of the semicircular upper portion of the rotational portion mounting portion 82*b*, the platelike support shaft 82*d* is formed on a centerline vertically extending (along arrows Z1 and Z2) from the center of the vertical support member 82 along arrows X1 and X2. This support shaft 82*d* is so provided as to vertically extend along arrow Y2, and in the form of a flat plate elongated in the vertical direction (along arrows Z1 and Z2), as shown in FIG. 10. The support shaft 82*d* is formed integrally with the vertical support member 82, by partially uprightly bending the vertical support member 82 of sheet metal. A hole portion 82*e* is formed on the uprightly bent portion of the vertical support member 82, as shown in FIG. 9.

As shown in FIGS. 4 to 6, the support shaft 82*d* of each vertical support member 82 is so provided as to be inserted into the sectoral hole portion 81*f* of the corresponding rotational portion 81*b*. More specifically, the support shaft 82*d* is so formed that the upper surface 82*f* thereof comes into contact with the bottom portion 81*g* of the sectoral hole portion 81*f* while a platelikely extending surface is inserted in a vertical state, as shown in FIG. 4. Thus, the support shaft 82*d* receives the vertical load of the display body 10 (see FIG. 2) on the upper surface 82*f* through the bottom portion 81*g* of the sectoral hole portion 81*f* and the display screen support member 81. The display screen support portion 81 is rendered rotatable around the bottom portion 81*g* of the sectoral hole portion 81*f* supported by the platelike support shaft 82*d* in the angular range of the sectoral hole portion 81*f* with respect to the support shaft 82*d*. In other words, the platelike support shaft 82*d* functions as the rotating shaft of the display screen support member 81. Thus, the display screen support member 81 renders the display body 10 anteroposteriorly rotatable (along arrows C and D) with respect to the vertical plane of the display screen turning apparatus 20 in the state where the upper surface 82*f* of the support shaft 82*d* and the bottom portion 81*g* of the sectoral hole portion 81*f* are in contact with each other.

The surface of the platelike support shaft 82*d* platelikely extending along arrows X1 and X2 is so formed as not to come into contact with the side surfaces of the sectoral hole portion 81*f* extending along arrows X1 and X2 respectively in the limit of anteroposterior rotation (along arrows C and D) of the display body 10 with respect to the vertical plane of the display screen turning apparatus 20. In other words, the platelikely extending surface of the platelike support shaft 82*d* is so formed as not to come into contact with the side surfaces of the sectoral hole portion 81*f* while the display body 10 is anteroposteriorly rotated (along arrows C and D) with respect to the vertical plane of the display screen turning apparatus 20.

Figure 11:
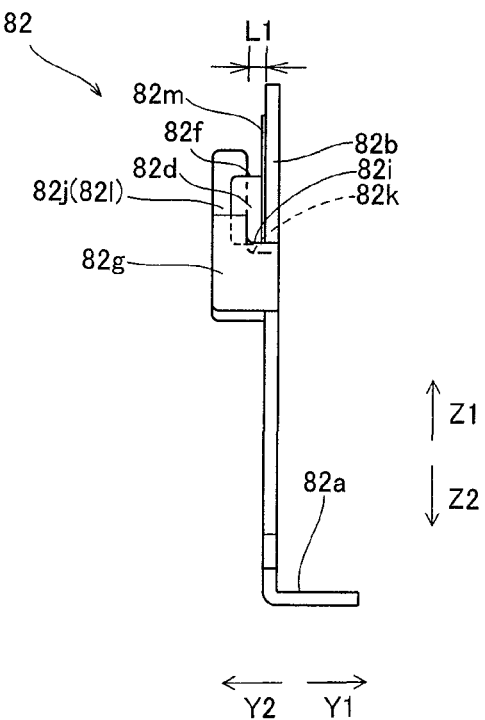
FIG. 11 is a side elevational view of the vertical support member according to the embodiment of the present invention shown in FIG. 9, as viewed along arrow X1.

According to this embodiment, a hook 82*g* is formed integrally with the vertical support member 82 on the side surface of the rotational portion mounting portion 82*d* extending from the support shaft 82*d* along arrow X1, as shown in FIG. 9. This hook 82*d* is formed by partially uprightly bending the vertical support member 82 of sheet metal. The hook 82*g* is an example of the "stop portion" or the "first stop portion" in the present invention. More specifically, the hook 82*g* is so formed as to extend from the side surface extending along arrow X1 (see FIG. 9) perpendicularly to the rotational portion mounting portion 82*b* along arrow Y2, as shown in FIG. 11. The interval L1 between a stop portion 82*h* of the hook 82*g* and the rotational portion mounting portion 82*b* is slightly larger than the thickness t1 of the rotational portion 81*b* of the display screen support member 81. Further, the hook 82*g* is provided with the stop portion 82*h* extending upward (along arrow Z1) and thereafter horizontally extending along arrow X2, as shown in FIG. 9. Thus, a clearance 82*i* is formed between the hook 82*g* and the rotational portion mounting portion 82*b*, as shown in FIG. 11. This clearance 82*i* is so formed as to rotatably hold the display screen support member 81 when the support shaft 82*d* of the rotational portion mounting portion 82*b* is inserted into the hole portion 81*f* of the display screen support member 81.

Figure 12:
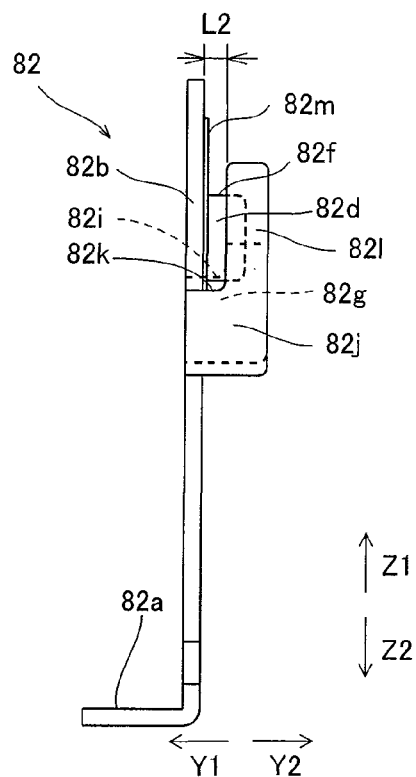
FIG. 12 is a side elevational view of the vertical support member according to the embodiment of the present invention shown in FIG. 9, as viewed along arrow X2.

As shown in FIG. 9, the corresponding hook 82*j* is formed integrally with the vertical support member 82 on the side surface of the rotational portion mounting portion 82*b* extending from the support shaft 82*d* along arrow X2. This hook 82*j* is formed by partially uprightly bending the vertical support member 82 of sheet metal. The hook 82*j* is an example of the "stop portion" or the "second stop portion" in the present invention. More specifically, a contact portion 82*k* is so provided on the hook 82*j* as to extend from the side surface extending along arrow X2 (see FIG. 9) perpendicularly to the rotational portion mounting portion 82*b* along arrow Y2, as shown in FIG. 12. The interval L2 between a stop portion 82*h* of the hook 82*j* and the rotational portion mounting portion 82*b* is slightly larger than the thickness t1 of the rotational portion 81*b* of the display screen support member 81. Further, the stop portion 82*l* is so provided on the hook 82*j* as to extend upward (along arrow Z1) on the side (along arrow Y2) of the contact portion 82*k* opposite to the rotational portion mounting portion 82*b*. When the display screen support member 81 is rotated along arrow D (see FIG. 4) by a prescribed angle with respect to the vertical plane while the support shaft 82*d* of the rotational portion mounting portion 82*b* is inserted into the hole portion 81*f* of the display screen support member 81, the protrusion 81*e* of the rotational portion 81*b* of the display screen support member 81 comes into contact with the contact portion 82*k*. The stop portion 82*l* is so formed as to rotatably hold the display screen support member 81 along with the rotational portion mounting portion 82*b* when the support shaft 82*d* of the rotational portion mounting portion 82*b* is inserted into the hole portion 81*f* of the display screen support member 81. In other words, the display screen support member 81 is rotatably held between the hooks 82*g* and 82*j* and the rotational mounting portion 82*b*. The hooks 82*g* and 82*j* stop the rotational portion 81*b* and the protrusion 81*e* of the display screen support member 81 respectively, thereby inhibiting the support shaft 82*d* from coming off the hole portion 81*f*.

Figure 13:
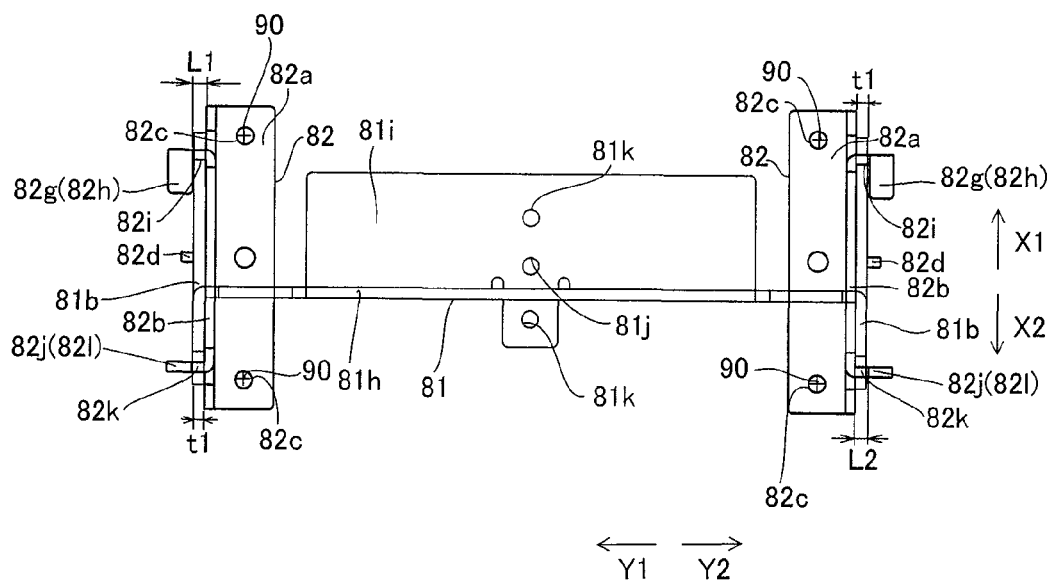
FIG. 13 is a plan view of the display screen support member and the vertical support member according to the embodiment of the present invention, as viewed from above (along arrow Z1 in FIG. 5)

As shown in FIG. 13, the hooks 82*g* and 82*j* are so formed as to hold the support shaft 82*d* of the rotational portion mounting portion 82*b* along arrows X1 and X2.

When the display screen support member 81 is rotated beyond the anteroposterior rotational range (along arrows C and D in FIG. 1) with respect to the vertical plane in the used state of the display screen turning apparatus 20, the surface of the platelike support shaft 82*d* platelikely extending along arrow X1 comes into contact with the side surface of the sectoral hole portion 81*f* extending along arrow X1. The notched portion 81*d* of the rotational portion 81*b* of the display screen support member 81 is so formed as to have a horizontally extending upper surface at this time, and the stop portion 82*h* of the hook 82*g* of the vertical support member 82 is formed to be separable from the notched portion 81*d* along arrow Y1 (see FIG. 6). Further, the lower end portion of the protrusion 81*e* of the rotational portion 81*b* is so positioned upward beyond the upper end portion of the stop portion 82*l* of the hook 82*j* of the vertical support member 82 as to release the stop portion 82*k* and the rotational portion mounting portion 82*b* of the hook 82*j* of the vertical support member 82 from regulating movement of the protrusion 81*e* of the rotational portion 81*b* along arrows Y1 and Y2 (see FIG. 6), whereby the hook 82*j* of the vertical support member 82 is rendered movable along arrow Y1. Thus, the vertical support member 82 is disengaged from the display screen support member 81 when the display screen support member 81 is rotated beyond the rotational range with respect to the vertical plane in the used state of the display screen turning apparatus 20.

As shown in FIG. 9, a ring-shaped protrusion 82*m* is formed around a substantially central portion of the support shaft 82*d* on the surface of the rotational portion mounting portion 82*b* extending along arrow Y2 (see FIG. 6). This protrusion 82*m* is so formed as to come into contact with the surface of the rotational portion 81*b* of the display screen support member 81 extending along arrow Y1 when the display screen support member 81 is anteroposteriorly rotated (along arrows C and D in FIG. 1) with respect to the vertical plane while the support shaft 82*d* of the rotational portion mounting portion 82*b* is inserted into the hole portion 81*f* of the display screen support member 81, as shown in FIG. 6. Thus, the contact area between the rotational portion 81*b* of the display screen support member 81 and the rotational portion mounting portion 82*b* is so reduced as to reduce frictional force acting between the rotational portion 81*b* and the rotational portion mounting portion 82*b*. When the display screen support member 81 is anteroposteriorly rotated with respect to the vertical plane, therefore, the load applied to the vertical turning/driving portion 50, the rack gear 63 and the rotational gear 83 can be reduced.

The rotational gear 83 is so provided as to mesh with the rack gear 63 of the rack plate 60 from above, and arranged at a substantially central portion of the lower surface portion 81*i* of the display screen support member 81, as shown in FIG. 5. Further, the rack gear 63 and the rotational gear 83 are positioned on the horizontal rotation centerline (along arrows G1 and G2 in FIG. 6) of the turntable 31 and the display screen support member 81. The pair of bosses 83*b* inserted into the pair of boss receiving holes 81*k* of the display screen support member 81 are formed on the upper surface 83*a* of the rotational gear 83, as shown in FIG. 6. A threaded hole 83*c* meshing with the screw 90 is formed on a central portion between the pair of bosses 83*b*. This threaded hole 83*c* is so formed as to correspond to the screw receiving hole 81*j* of the display screen support member 81.

As shown in FIG. 6, further, a tooth flank is formed on the lower surface 83*d* of the rotational gear 83, to have an arcuate shape convexed downward as viewed from a side portion. Thus, the rotational gear 83 is slidable with respect to the rack gear 63 perpendicularly to the meshing direction, along arrows S and T (see FIG. 3), of the rack gear 63 and the rotational gear 83. The upper surface 83*a* of the rotational gear 83 is fixed to the lower surface portion 81*i* of the display screen support member 81 with the screw 90, as shown in FIG. 5. Thus, the rotational gear 83 is so fixed to the display screen support member 81 that the rotation of the display screen support member 81 in the horizontal plane is transmitted to the rack gear 63 meshing with the rotational gear 83 through the rotational gear 83.

As shown in FIGS. 4 and 5, the base portion 30 is constituted of the turntable 31 of sheet metal mounted with the display screen support mechanism 80, a guide member 33 of resin having a plurality of steel balls 32 arranged therein at prescribed intervals and rotatably holding the steel balls 32, a base member 34 of sheet metal, a plurality of support members (not shown) of metal rotatably supporting the turntable 31 on the base member 34, a boss member 35 of resin rotatably receiving rotating shafts of gears 45 and 55 described later while receiving the rack plate 60 of the vertical turning/driving portion 50 to be reciprocative in the horizontal plane and a ring member 36 for preventing the rack plate 60 inserted into the boss member 35 from coming off.

The turntable 31 of the base portion 30 includes four screw mounting holes 31*b* provided on the upper surface 31*a* and a hole 31*c* provided at the central portion (in the vicinity of the rotation center of the turntable 31) of the upper surface 31*a*, as shown in FIGS. 5 and 6. As shown in FIG. 3, the turntable 31 is arranged at a substantially central portion of the base member 34, and so arranged as to be rotatable in the horizontal plane. As shown in FIG. 5, the plurality of support members (not shown) so provided on the base member 34 as to circularly enclose the turntable 31 come into surface contact with outer peripheral surfaces 31*d* and 33*a* of the turntable 31 and the guide member 33, thereby holding the turntable 31 to be rotatable in the horizontal plane.

As shown in FIGS. 3 and 5, the vertical turning/driving portion 50 is constituted of a transmission gear portion 51 consisting of a plurality of gear members, a stepping motor 52 serving as the driving source for the transmission gear portion 51 and the rack plate 60 for anteroposteriorly rotating the display screen support member 81 (along arrows C and D in FIG. 1) rotatably provided on the display screen support mechanism 80 mounted on the turntable 31 of the base portion 30 with respect to the vertical plane.

The transmission gear portion 51 is so formed that a gear 53 of resin, a torque limiter 70 and another gear 54 of resin are arranged in a gear box 56 of resin while still another gear 55 of resin is arranged outside the gear box 56, as shown in FIG. 3. The gear 53 of resin integrally includes a large-diametral gear portion 53*a* and a small-diametral gear portion 53*b*. The gears 54 and 55 of resin also integrally include large-diametral gear portions 54*a* and 55*a* and small-diametral gear portions 54*b* and 55*b* respectively.

As shown in FIGS. 3 and 5, a worm gear 57 of resin is press-fitted into the rotating shaft of the stepping motor 52. The worm gear 57 so meshes with the large-diametral gear portion 53*a* of the gear 53 that the rotating shaft is orthogonal thereto. Therefore, driving force generated by the stepping motor 52 is transmitted to the gear 53 through the worm gear 57, while driving force generated by the gear 53 and the gear group subsequent thereto cannot rotate the worm gear 57 and the stepping motor 52. In other words, only the driving force generated by the stepping motor 52 is transmitted to the transmission gear portion 51 through the worm gear 57.

As shown in FIG. 3, the small-diametral gear portion 53*b* of the gear 53 meshes with a driving gear 72 of the torque limiter 70. A driven gear 71 of the torque limiter 70 meshes with the large-diametral gear portion 54*a* of the gear 54, while the small-diametral gear portion 54*b* of the gear 54 meshes with the large-diametral gear portion 55*a* of the gear 55. The small-diametral gear portion 55*b* of the gear 55 horizontally meshes with a gear portion 62*a* of a rack gear 62. Therefore, the driving force of the stepping motor 52 is transmitted to the rack plate 60 through the worm gear 57, the gear 53, the torque limiter 70, the gears 54 and 55 and the rack gear 62.

As shown in FIG. 5, the rack plate 60 is constituted of a plate member 61 of sheet metal and the rack gears 62 and 63 of resin. The rack gear 62 is mounted on the lower surface of the plate member 61 with one screw 90. This rack gear 62 is so formed as to horizontally mesh with the small-diametral gear portion 55*b* of the gear 55 described later, as shown in FIG. 3.

Slots 61*a* and 61*b* extending along the longitudinal direction of the plate member 61 are formed in the vicinity of both longitudinal end portions of the plate member 61 respectively, as shown in FIG. 5. The rack plate 60 is so formed that first end portions of the inner side surfaces of the slots 61*a* and 61b come into contact with both side surfaces of the boss member 35 respectively, to be inhibited from sliding. Further, the rack plate 60 is so formed that the rotational range of the display screen support member 81 with respect to the vertical plane is limited on the position where the rack plate 60 is inhibited from sliding in the used state of the display screen turning apparatus 20.

A circular receiving hole 61c receiving a protrusion 63a of the rack gear 63 is formed on a substantially central portion of the plate member 61. The plate member 61 further has two positioning holes 61d and a screw mounting hole 61e.

The rack gear 62 is provided with the gear portion 62a as well as two bosses 62b and a screw receiving hole 62c along the longitudinal side surface extending along arrow Y1, as shown in FIG. 5. Therefore, the rack gear 62 can be mounted on the plate member 61 from below by fitting the bosses 62b of the rack gear 62 into the positioning holes 61d of the plate member 61 and threading the screw 90 into the screw mounting hole 61e of the plate member 61 through the screw receiving hole 62c of the rack gear 62.

A tooth flank 63b having a plurality of tips is flatly formed on the surface, arranged on the plate member 61, of the rack gear 63 extending along arrow Z1, as shown in FIG. 5. The ring-shaped protrusion 63a insertable into the receiving hole 61c of the plate member 61 is formed at a substantially central portion of the back surface 63c, extending along arrow Z2, of the rack gear 63. Thus, the tooth flank 63b is converted into a horizontal surface (flat surface) and rendered rotatable along arrows H1 and H2 (see FIG. 3) with respect to the plate member 61 when the protrusion 63a is inserted into the receiving hole 61c of the plate member 61.

Further, the rack plate 60 is so formed as to be linearly reciprocative along arrows P and Q when the rack plate 60 is inserted into the pair of boss members 35 through the slots 61a and 61b of the plate member 61 respectively, as shown in FIGS. 3 and 4. Thus, normal/reverse rotation of the stepping motor 52 is so transmitted to the rack gear 62 through the transmission gear portion 51 that the rack plate 60 is linearly reciprocative on the turntable 31 along arrows P and Q.

The horizontal turning/driving portion 40 is constituted of a transmission gear portion 41 for horizontally rotating the turntable 31 provided on the base portion 30 in the horizontal plane (along arrows A and B in FIG. 1) and a stepping motor 42 serving as the driving source for the transmission gear portion 41, as shown in FIGS. 3 and 5. The horizontal turning/driving portion 40 is arranged in the base portion 30, as shown in FIG. 3. The transmission gear portion 41 is so formed that a gear 43 of resin, a torque limiter 75 and another gear 44 of resin are arranged in a gear box 46 of resin while still another gear 45 of resin is arranged outside the gear box 46.

A worm gear 47 of resin is press-fitted into the rotating shaft of the stepping motor 42, as shown in FIGS. 3 and 5. The gear 43 integrally includes a large-diametral gear portion 43a and a small-diametral gear portion 43b, as shown in FIG. 3. The gears 44 and 45 also integrally include large-diametral gear portions 44a and 45a and small-diametral gear portions 44b and 45b. A turning gear member 48 of resin is fixed to the upper surface 31a of the turntable 31 of the base portion 30 with four screws 90.

The worm gear 47 so meshes with the large-diametral gear portion 43a of the gear 43 that the rotating shaft is orthogonal thereto, while the small-diametral gear portion 43b of the gear 43 meshes with a driving gear 77 of the torque limiter 75. A driven gear 76 of the torque limiter 75 meshes with the large-diametral gear portion 44a of the gear 44, while the small-diametral gear portion 44b of the gear 44 meshes with the large-diametral gear portion 45a of the gear 45. The small-diametral gear portion 45b of the gear meshes with a turning gear portion 48a of the turning gear member 48. Therefore, driving force of the stepping motor 42 is transmitted to the turntable 31 through the worm gear 47, the gear 43, the torque limiter 75, the gears 44 and 45 and the turning gear member 48.

The torque limiters 70 and 75 provided in the transmission gear portions 51 and 41 are so formed as to transmit the driving force of the stepping motors 52 and 42 to the transmission gear portions 51 and 41 when the driving force of the stepping motors 51 and 41 is not more than prescribed torque and not to transmit the driving force of the stepping motors 52 and 42 to the transmission gear portions 51 and 41 when the driving force of the stepping motors 51 and 41 exceeds the prescribed torque.

The display body 10 is constituted of a front cabinet 11 of resin and a rear cabinet 12 of resin, as shown in FIGS. 1 and 2. Screws 90 are so threaded into screw mounting holes (not shown) of the rear cabinet 12 through the screw receiving holes 81c (see FIG. 5) of the display screen support member 81 as to mount the display body 10 on the display screen support member 81. The rear cabinet 12 is integrally provided with a notched portion 12a for concealing the display screen support member 81. A plurality of screw receiving holes 12b are provided on the outer peripheral portion of the rear cabinet 12, so that the rear cabinet 12 is mounted on the front cabinet 11 with screws 91.

In the display screen turning apparatus 20, a cover member 21 of resin is mounted on the base member 34 with screws (not shown) inserted from the lower surface of the base member 34 of the base portion 30, as shown in FIG. 4. As shown in FIGS. 1 and 4, another cover member 22 of resin is mounted on the upper surface 31a of the turntable 31 with screws (not shown), to cover the base portion 30 from above and to be horizontally turnable (along arrows A and B in FIG. 1) integrally with the turntable 31 of the base portion 30. As shown in FIGS. 2 and 4, the cover member 22 of resin is provided with a notched portion 22a for arranging the display screen support member 81 to be anteroposteriorly rotatable (along arrows C and D in FIG. 1).

Attachment and detachment of the display screen support member 81 according to the embodiment of the present invention and the vertical support member 82 mounted on the rotational portion 81b provided along arrow Y2 are now described with reference to FIGS. 5 and 14.

Figure 14:
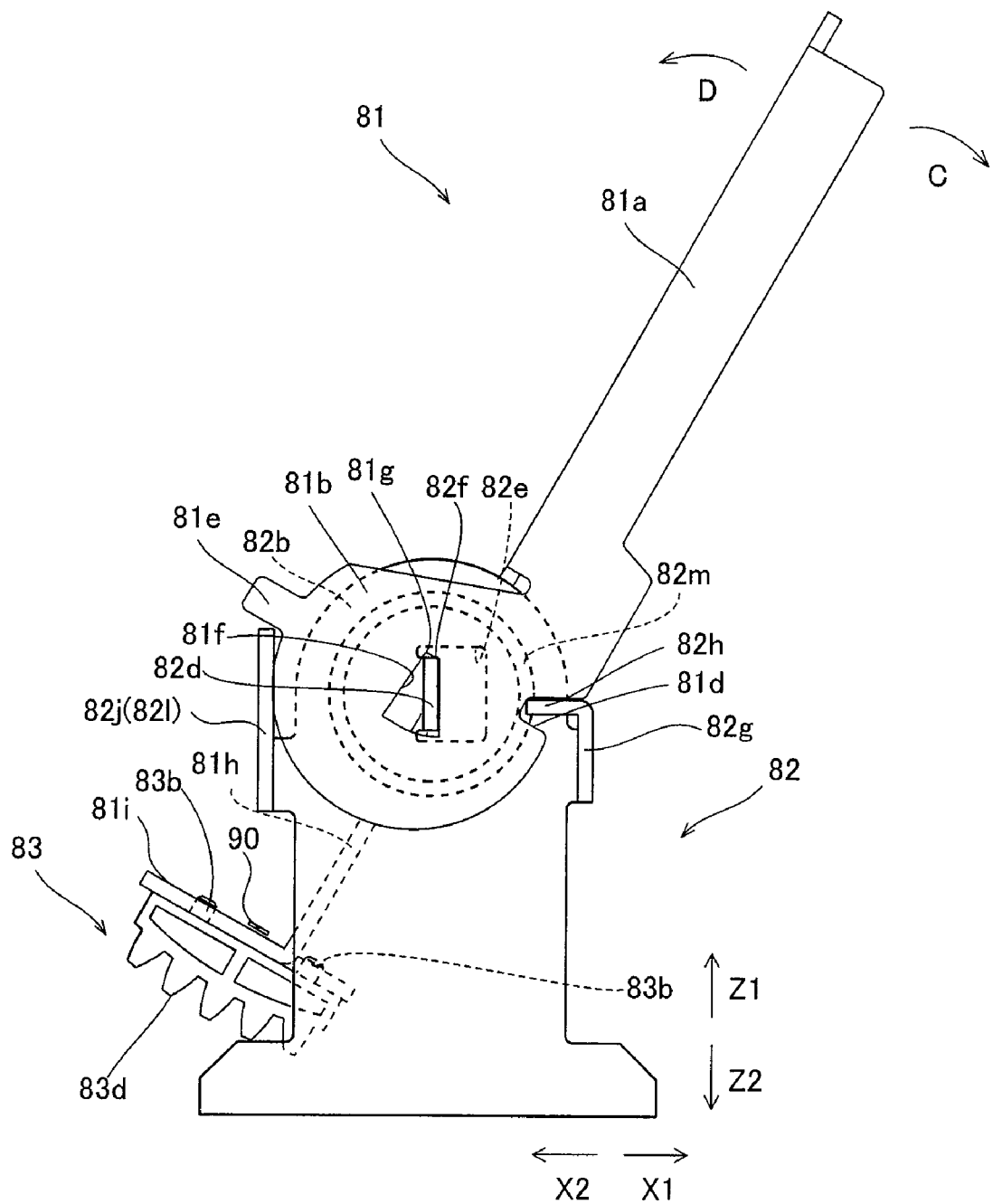
FIG. 14 is a diagram for illustrating attachment and detachment of the display screen support member and the vertical support member according to the embodiment of the present invention.

In order to attach the vertical support member 82 to the display screen support member 81, the display screen support member 81 is rotated along arrow C over the limit of the rotational range of the display screen support member 81 along arrow C with respect to the vertical plane in the used state of the display screen turning apparatus 20, as shown in FIG. 14. Thus, the stop portion 82h of the hook 82g of the vertical support member 82 and the notched portion 81d of the rotational portion 81b of the display screen support member 81 correspond to each other, so that the stop portion 82h of the hook 82g is attachable to the notched portion 81d of the rotational portion 81b. Further, the protrusion 81e of the rotational portion 81b of the display screen support member 81 is not inhibited from movement along arrows Y1 and Y2 (see FIG. 5) by the stop portion 82i of the hook 82j of the vertical support member 82. Thus, the support shaft 82d of the rotational portion mounting portion 82b is arranged to be inserted into the hole portion 81f of the rotational portion 81b.

Then, the display screen support member 81 is rotated along arrow D. Thus, the stop portion 82h of the hook 82g is unseparable from the notched portion 81d of the rotational portion 81b, while the protrusion 81e of the rotational portion

81b is inhibited from movement along arrows Y1 and Y2 by the stop portion 821 of the hook 82j. Consequently, the vertical support member 82 is attached to the display screen support member 81.

In order to detach the vertical support member 82 from the display screen support member 81, the display screen support member 81 is rotated along arrow C over the limit of the rotational range of the display screen support member 81 along arrow C with respect to the vertical plane in the used state of the display screen turning apparatus 20, as shown in FIG. 14. Thus, the stop portion 82h of the hook 82g and the notched portion 81d of the rotational portion 81b correspond to each other, so that the stop portion 82h of the hook 82g is separable from the notched portion 81d of the rotational portion 81b. Further, the protrusion 81e of the rotational portion 81b is released from the inhibition of the movement along arrows Y1 and Y2 (see FIG. 5) by the stop portion 821 of the hook 82j. Thus, the vertical support member 82 is movable along arrows Y2 and Y1 respectively. The vertical support member 82 is detached from the display screen support member 81 in this manner.

Anteroposterior and horizontal turning operations of the display screen turning apparatus 20 according to the embodiment of the present invention are now described with reference to FIGS. 1, 3 to 5 and 15 to 17.

When the display screen turning apparatus 20 anteroposteriorly rotates the display screen support mechanism 80 (along arrows C and D) with respect to the vertical plane as shown in FIG. 4, the display body 10 shown in FIG. 1 is rotated upward and downward, and hence the anteroposterior direction is hereinafter referred to as upward and downward directions.

Upward and downward turning operations (along arrows C and D in FIG. 1) of the display screen turning apparatus 20 are now described.

First, the user presses an upward tilt button (not shown) of an attached remote control (not shown), thereby transmitting a signal for turning the display body 10 (see FIG. 1) upward (along arrow C in FIG. 1) to a control circuit portion (not shown) of the display body 10. The stepping motor 52 of the display screen turning apparatus 20 is driven on the basis of this signal. More specifically, the worm gear 57 mounted on the stepping motor 52 is rotated following the driving of the stepping motor 52, while the driving gear 72 of the torque limiter 70 is rotated along arrow E1 through the gear 53, as shown in FIG. 3. The driven gear 71 of the torque limiter 70 is also rotated along arrow E1, while the gear 55 is rotated along arrow E2 through the gear 54. Thus, the plate member 61 of the rack plate 60 moves along arrow P with the rack gear 62 horizontally meshing with the gear 55, following the rotation of the gear 55 along arrow E2.

Figure 15:
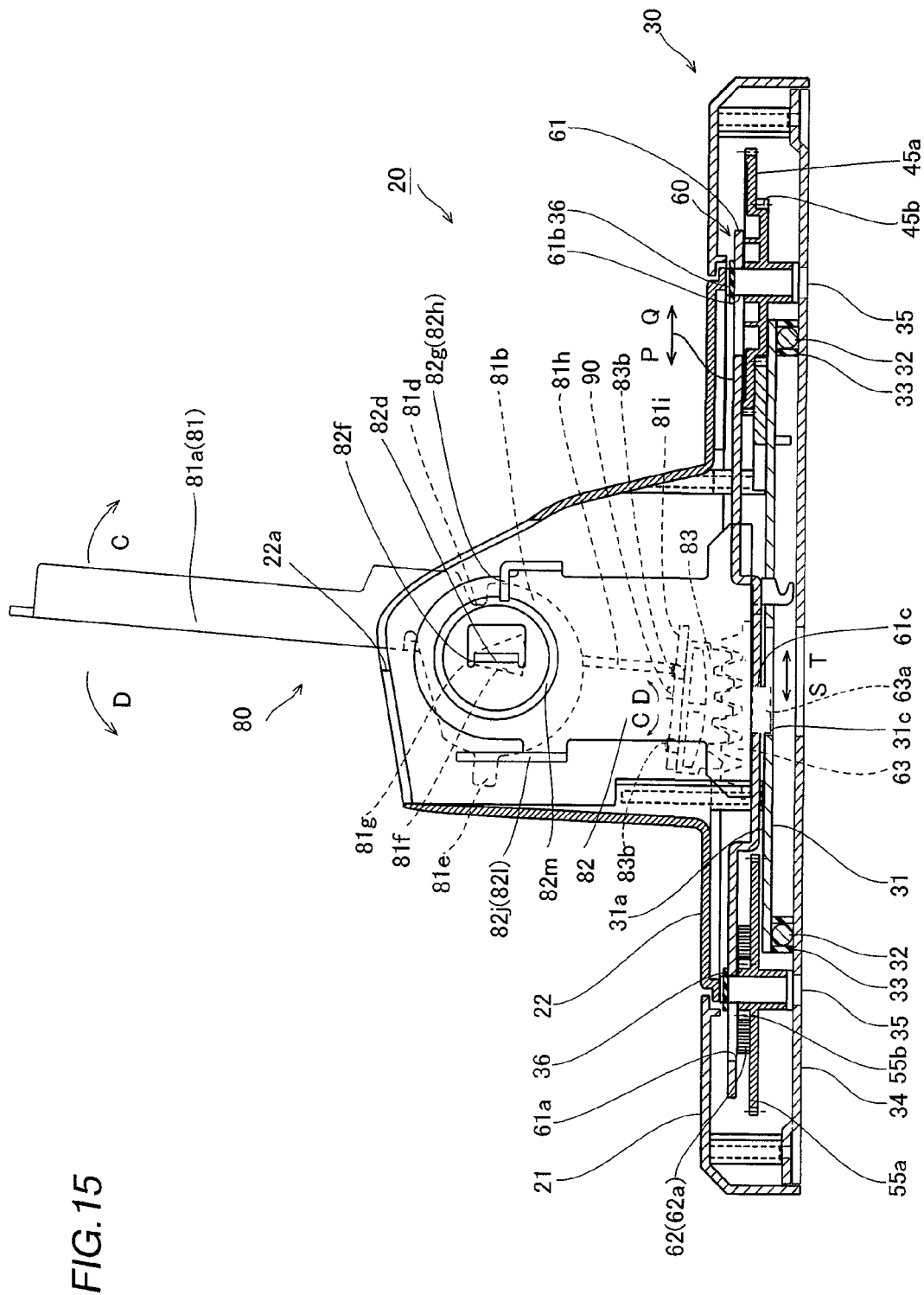
FIG. 15 is a sectional view for illustrating an upward turning operation (along arrow C) of the display screen turning apparatus according to the embodiment of the present invention shown in FIG. 1.

As shown in FIG. 15, the plate member 61 so moves along arrow P that the rack gear 63 also moves along arrow S following the plate member 61. When the rack gear 63 moves along arrow S, therefore, the rotational gear 83 meshing with the rack gear 63 is rotated along arrow C while maintaining the meshing state. Consequently, the display screen support member 81 is turned upward (along arrow C) at a prescribed rotational speed. At this time, the display screen support member 81 is rotated around the rotation center of the upper surface 82f of the support shaft 82d of each vertical support member 82 while the bottom portion 81g of each sectoral hole portion 81f thereof and the upper surface 82f of the support shaft 82d of the corresponding vertical support member 82 are in contact with each other.

When turning the display body 10 (see FIG. 1) along arrow C up to a desired angle, the user releases the upward tilt button (not shown) of the attached remote control (not shown), so that the signal for turning the display body 10 upward (along arrow C) is not transmitted to the control circuit portion (not shown) of the display body 10 and driving of the stepping motor 52 is stopped. Thus, the display screen support member 81 stops turning along arrow C, and stands still.

When the user continuously turns the display body 10 (see FIG. 1) upward (along arrow C), the first end portions of the inner side surfaces of the slots 61a and 61b provided on the plate member 61 come into contact with the side surfaces of the boss member 35 respectively, so that the rack plate 60 slid along arrow P is inhibited from the sliding along arrow P, as shown in FIG. 15. Therefore, the display body 10 stops turning along arrow C and stands still. At this time, the display screen support member 81 reaches a prescribed turning angle while the surface of each platelike support shaft 82d platelikely extending along arrow X1 (see FIG. 9) is not in contact with the side surface of the corresponding sectoral hole portion 81f extending along arrow X1 (see FIG. 7). This prescribed turning angle limits the rotational range of the display screen support member 81 along arrow C with respect to the vertical plane in the used state of the display screen turning apparatus 20.

According to this embodiment, the notched portion 81d of each rotational portion 81b of the display screen support member 81 is not located on the position corresponding to the stop portion 82h of the hook 82g of the corresponding vertical support member 82 so that the stop portion 82h of the hook 82g is unseparable from the notched portion 81d of the rotational portion 81b in the limit of the rotational range of the display screen support member 81 along arrow C with respect to the vertical plane in the used state of the display screen turning apparatus 20, as shown in FIG. 15. In this case, the protrusions 81e of the rotational portions 81b are inhibited from movement along arrows Y1 and Y2 (see FIG. 5) by the stop portions 82k of the hooks 82j of the vertical support members 82 provided along arrows Y1 and Y2. Thus, the pair of vertical support members 82 are kept in engagement with the display screen support member 81 in the rotational range of the display screen support member 81 along arrow C with respect to the vertical plane in the used state of the display screen turning apparatus 20.

While the stepping motor 52 (see FIG. 3) is continuously driven at this time, the driving force thereof is not transmitted to the transmission gear portion 51 when exceeding the prescribed torque. When the movement (sliding) of the rack plate 60 along arrow P is stopped, therefore, the rotation is stopped regardless of the driving of the stepping motor 52.

Then, the user presses a downward tilt button (not shown) of the attached remote control (not shown), thereby transmitting a signal for turning the display body 10 (see FIG. 1) downward (along arrow D in FIG. 1) to the control circuit portion (not shown) of the display body 10 and driving the stepping motor 52 of the display screen turning apparatus 20. Thus, the worm gear 57 mounted on the stepping motor 52 is rotated, while the driving gear 72 of the torque limiter 70 is rotated along arrow F1 through the gear 53, as shown in FIG. 3. The driven gear 71 of the torque limiter 70 is also rotated along arrow F1, while the gear 55 is rotated along arrow F2 through the gear 54. The rack plate 60 moves along arrow Q with the rack gear 62.

Figure 16:
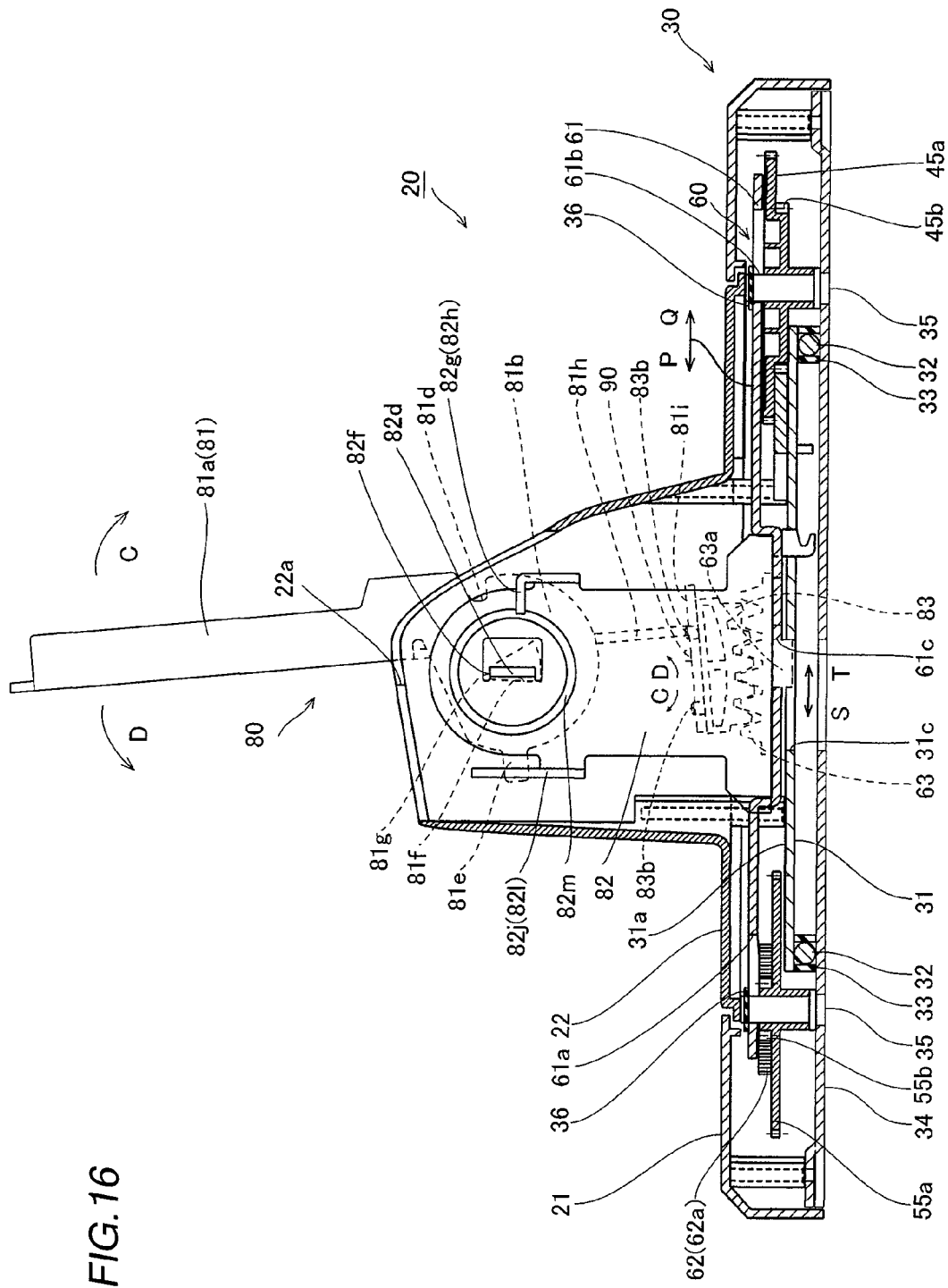
FIG. 16 is a sectional view for illustrating a downward turning operation (along arrow D) of the display screen turning apparatus according to the embodiment of the present invention shown in FIG. 1.

As shown in FIG. 16, the plate member 61 so moves along arrow Q that the rack gear 63 also moves along arrow T following the plate member 61. When the rack gear 63 moves along arrow T, therefore, the rotational gear 83 meshing with the rack gear 63 is rotated along arrow D while maintaining the meshing state. Consequently, the display screen support member 81 is turned downward (along arrow D) at a prescribed rotational speed. At this time, the display screen support member 81 is rotated around the upper surface 82ƒ of each support shaft 82d while the bottom portion 81g of each sectoral hole portion 81ƒ thereof is in contact with the upper surface 82ƒ of the support shaft 82d of the corresponding vertical support member 82.

When turning the display body 10 (see FIG. 1) along arrow D up to a desired angle, the user releases the downward tilt button (not shown) of the attached remote control (not shown), so that the signal for turning the display body 10 downward (along arrow D) is not transmitted to the control circuit portion (not shown) of the display body 10 and driving of the stepping motor 52 is stopped. Thus, the display screen support member 81 stops turning along arrow D, and stands still.

When the user continuously turns the display body 10 (see FIG. 1) downward (along arrow D), second end portions of the inner side surfaces of the slots 61a and 61b provided on the plate member 61 come into contact with the side surfaces of the boss member 35 respectively, so that the rack plate 60 slid along arrow Q is inhibited from the sliding along arrow Q, as shown in FIG. 16. Therefore, the display body 10 stops turning along arrow D and stands still. At this time, the display screen support member 81 reaches a prescribed turning angle while the surface of the platelike support shaft 82d platelikely extending along arrow X2 (see FIG. 9) is not in contact with the side surface of the sectoral hole portion 81ƒ extending along arrow X2 (see FIG. 7). This prescribed turning angle limits the rotational range of the display screen support member 81 along arrow D with respect to the vertical plane in the used state of the display screen turning apparatus 20.

According to this embodiment, the notched portion 81d of each rotational portion 81b of the display screen support member 81 is not located on the position corresponding to the stop portion 82h of the hook 82g of the corresponding vertical support member 82 so that the stop portion 82h of the hook 82g is unseparable from the notched portion 81d of the rotational portion 81b in the limit of the rotational range of the display screen support member 81 along arrow D with respect to the vertical plane in the used state of the display screen turning apparatus 20, as shown in FIG. 16. In this case, the protrusions 81e of the rotational portions 81b are inhibited from movement along arrows Y1 and Y2 (see FIG. 5) by the stop portions 82k of the hooks 82j of the vertical support members 82 provided along arrows Y1 and Y2. Thus, the pair of vertical support members 82 are kept in engagement with the display screen support member 81 in the rotational range of the display screen support member 81 along arrow D with respect to the vertical plane in the used state of the display screen turning apparatus 20.

While the stepping motor 52 (see FIG. 3) is continuously driven at this time, the driving force thereof is not transmitted to the transmission gear portion 51 when exceeding the prescribed torque. When the movement (sliding) of the rack plate 60 along arrow Q is stopped, therefore, the rotation is stopped regardless of the driving of the stepping motor 52.

A horizontal turning operation of the display screen turning apparatus 20 in the horizontal plane is now described.

Figure 17:
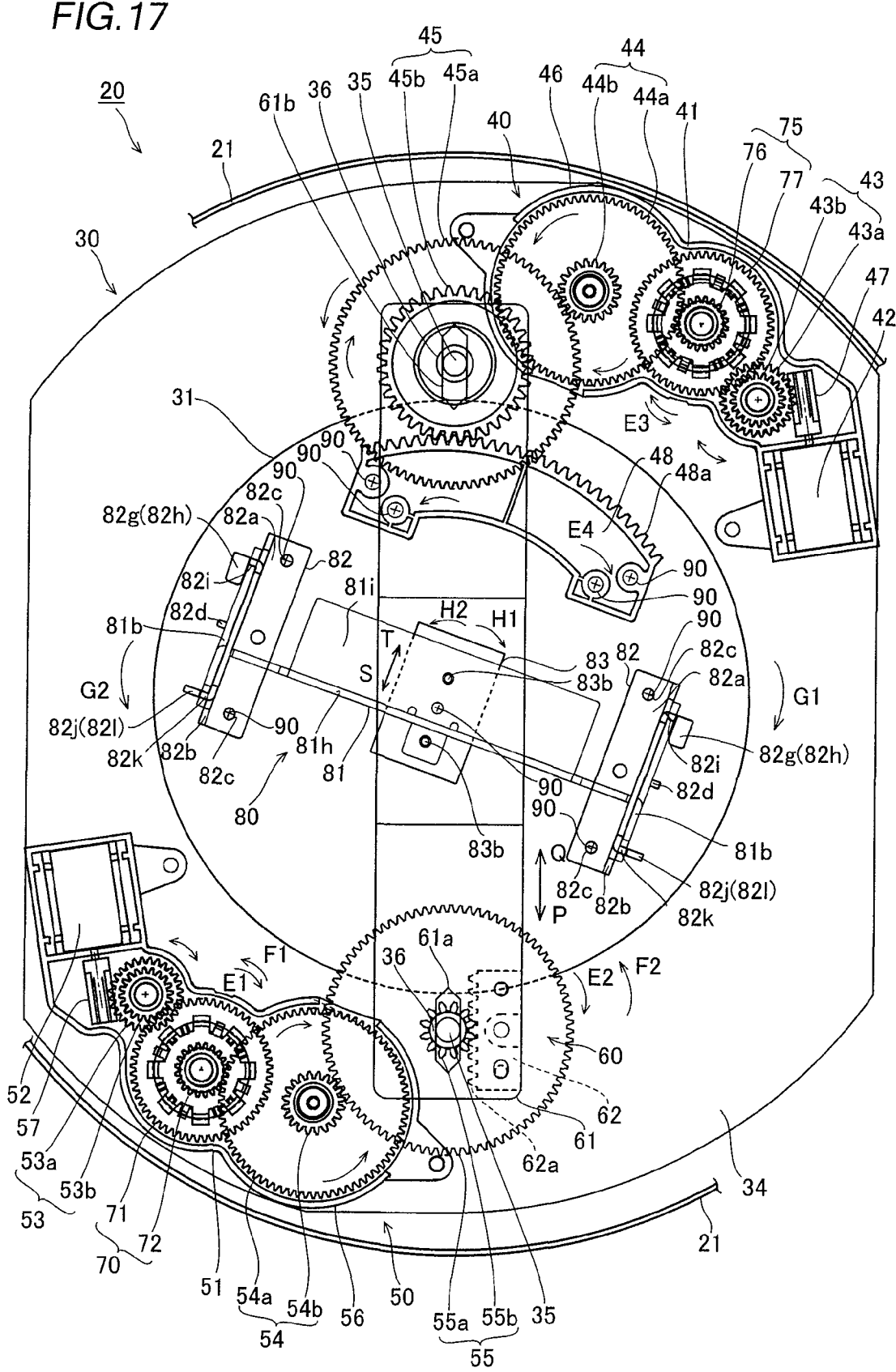
FIG. 17 is a plan view for illustrating a leftward turning operation (along arrow A) of the display screen turning apparatus according to the embodiment of the present invention shown in FIG. 1.

First, the user presses a horizontal turn button (not shown) of the attached remote control (not shown), thereby transmitting a signal for turning the display body 10 (see FIG. 1) leftward (along arrow A in FIG. 1) to the control circuit portion (not shown) of the display body 10 and driving the stepping motor 42 of the display screen turning apparatus 20. More specifically, the worm gear 47 mounted on the stepping motor 42 is rotated following the driving of the stepping motor 42, while the driving gear 77 of the torque limiter 75 is rotated along arrow E3 through the gear 43, as shown in FIG. 3. The driven gear 76 of the torque limiter 75 is also rotated along arrow E3, while the turning gear member 48 is rotated along arrow E4 through the gears 44 and 45. Thus, the turntable 31 provided on the base portion 30 mounted with the display screen support member 81 is turned along arrow G1, thereby turning the display body 10 leftward (along arrow A in FIG. 1) at a prescribed rotational speed, as shown in FIG. 17. At this time, the rotational gear 83 fixed to the display screen support member 81 is also rotated along arrow H1, following the turning of the display screen support member 81. Further, the rack gear 63 (see FIG. 4) so arranged as to mesh with the rotational gear 83 is also rotated following the rotation of the rotational gear 83 while maintaining the meshing state.

When turning the display body 10 (see FIG. 1) up to a desired angle, the user releases the horizontal turn button (not shown) of the attached remote control (not shown), so that the signal for turning the display body 10 leftward (along arrow A in FIG. 1) is not transmitted to the control circuit portion (not shown) of the display body 10 and driving of the stepping motor 42 is stopped. Thus, the base portion 30 stops turning along arrow G1 and stands still, as shown in FIG. 17.

When the turning angle of the base portion 30 reaches the maximum (300 in this embodiment) while the user continuously turns the display body 10 (see FIG. 1) leftward (along arrow A in FIG. 1), the turntable 31 comes into contact with a stopper member (not shown) provided in the base portion 30, to be inhibited from the leftward turning (along arrow A in FIG. 1). Therefore, the base portion 30 stops turning along arrow G1 and stands still. While the stepping motor 42 (see FIG. 3) is continuously driven at this time, the driving force thereof is not transmitted to the transmission gear portion 41 (see FIG. 3) when exceeding the prescribed torque. When the turntable 31 comes into contact with the stopper member (not shown), therefore, the rotation is stopped regardless of the driving of the stepping motor 42.

While the above turning operation has been described with reference to the case of turning the base portion 30 along arrow G1 shown in FIG. 3, the horizontal turning/driving portion 40 operates similarly to the above in a turning operation for oppositely turning the turntable 31 along arrow G2. Therefore, the display body 10 (see FIG. 1) can be turned rightward (along arrow B in FIG. 1) by turning the turntable 31 along arrow G2.

According to this embodiment, as hereinabove described, the display screen support member 81 has the hole portions 81ƒ and the vertical support members 82 have the platelike support shafts 82d inserted into the hole portions 81ƒ so that the display screen support member 81 can be anteroposteriorly rotated (along arrows C and D in FIG. 1) by a prescribed angle with respect to the vertical support members 82 around the platelike support shafts 82d inserted into the hole portions 81ƒ, whereby the display body 10 can be anteroposteriorly rotated by a prescribed angle with respect to the vertical plane. Further, the display screen support member 81, the vertical support members 82 and the support shafts 82d are so made of metal that the same can be improved in mechanical strength as compared with a case where the display screen support member 81, the vertical support members 82 and the support shafts 82d are made of resin, whereby the body of the display screen turning apparatus 20 can be prevented from breakage when the display body 10 and the display screen turning apparatus 20 are increased in size. In addition, the vertical support members 82 so integrally have the platelike support shafts 82*d* that no support shafts 82*d* may be separately provided for anteroposteriorly rotating the display body 10 by the prescribed angle with respect to the vertical plane, whereby increase in the number of components can be suppressed.

According to this embodiment, the vertical support members 82 have the hooks 82*g* and 82*j* for inhibiting the support shafts 82*d* from coming off the hole portions 81*f* in the anteroposterior rotational range (along arrows C and D in FIG. 1) of the display screen support member 81 with respect to the vertical plane in the used state of the display screen turning apparatus 20 when the support shafts 82*d* are inserted into the hole portions 81*f*, whereby the display screen support member 81 and the vertical support members 82 can be inhibited from disengagement when the display screen support member 81 is anteroposteriorly rotated with respect to the vertical plane. Further, the vertical support members 82 so integrally have the hooks 82*g* and 82*j* that neither the display screen support member 81 nor the vertical support members 82 may be provided with stop members for inhibiting the support shafts 82*d* from coming off the hole portions 81*f*, whereby increase in the number of components can be suppressed.

According to this embodiment, the vertical support members 82 are disengaged from the display screen support member 81 when the display screen support member 81 is rotated beyond the frontward rotational range (along arrow C in FIG. 1) of the display screen support member 81 with respect to the vertical plane in the used state of the display screen turning apparatus 20, whereby the vertical support members 82 can be kept in engagement with the display screen support member 81 in the used state of the display screen turning apparatus 20, while the vertical support members 82 can be attached to or detached from the display screen support member 81 by rotating the display screen support member 81 beyond the rotational range of the display screen support member 81 with respect to the vertical plane in the used state of the display screen turning apparatus when attaching or detaching the vertical support members 82 to or from the display screen support member 81.

According to this embodiment, the vertical support members 82 are made of sheet metal and the support shafts 82*d* as well as the hooks 82*g* and 82*j* are integrally formed on the vertical support members 82 by folding, whereby the vertical support members 82 having the support shafts 82*d* and the hooks 82*g* and 82*j* can be easily obtained by general sheet metal working.

According to this embodiment, the display screen support member 81 further has the notched portions 81*d* for separating the hooks 82*g* from the display screen support member 81 when the display screen support member 81 is rotated up to the position where the vertical support members 82 are disengaged from the display screen support member 81 so that the hooks 82*g* of the vertical support members 82 can be easily separated from the display screen support member 81 through the notched portions 81*d* of the display screen support member 81 when the vertical support members 82 are detached from the display screen support member 81, whereby the vertical support members 82 can be more easily detached from the display screen support member 81.

According to this embodiment, the hooks 82*j* stop the protrusions 81*e* in the anteroposterior rotational range of the display screen support member 81 with respect to the vertical plane in the used state of the display screen turning apparatus 20 when the support shafts 82*d* are inserted into the hole portions 81*f* so that the support shafts 82*d* can be further inhibited from coming off the hole portions 81*f*, whereby the display screen support member 81 and the vertical support members 82 can be further inhibited from disengagement when the display screen support member 81 is anteroposteriorly rotated with respect to the vertical plane.

According to this embodiment, the lower end portions of the protrusions 81*e* are located upward beyond the upper end portions of the hooks 82*j* thereby disengaging the protrusions 81*e* and the hooks 82l from each other when the display screen support member 81 is rotated beyond the frontward rotational range (along arrow C in FIG. 1) of the display screen support member 81 with respect to the vertical plane in the used state of the display screen turning apparatus 20, whereby the hooks 82*j* can be inhibited from causing difficulty in disengagement of the vertical support members 82 and the display screen support member 81 when the vertical support members 82 are detached from the display screen support member 81. Further, the shapes of the protrusions 81*e* may not be taken into consideration except those of the lower end portions thereof, whereby the protrusions 81*e* can be so shaped as to be easily stoppable by the hooks 82*j*. Thus, the hooks 82*j* can more reliably stop the protrusions 81*e*.

According to this embodiment, the protrusions 81*e* are integrally formed on the display screen support member 81, whereby the display screen support member 81 having the protrusions 81*e* can be easily obtained by general sheet metal working.

According to this embodiment, the stop portions 82*h* are so formed as to stop the display screen support member 81 in the anteroposterior rotational range of the display screen support member 81 with respect to the vertical plane in the used state of the display screen turning apparatus 20 and to be separable from the notched portions 81*d* so formed as to extend toward the hole portions 81*f* when the display screen support member 81 is rotated up to the position where the vertical support members 82 are disengaged from the display screen support member 81 so that the stop portions 82*h* horizontally extending toward the support shafts 82*d* can more stably stop the display screen support member 81, whereby the display screen support member 81 and the vertical support members 82 can be reliably prevented from disengagement when the display screen support member 81 is anteroposteriorly rotated with respect to the vertical plane. Further, the stop portions 82*h* can be separated from the notched portions 81*d* extending toward the hole portions 81*f* in the state where the display screen support member 81 and the vertical support members 82 can be disengaged from each other, whereby the display screen support member 81 can be more easily detached from the vertical support members 82.

According to this embodiment, the hooks 82*g* and 82*j* are so formed as to stop the display screen support member 81 and the protrusions 81*e* respectively in the anteroposterior rotational range of the display screen support member 81 with respect to the vertical plane in the used state of the display screen turning apparatus 20 when the support shafts 82*d* are inserted into the hole portions 82*d* so that the hooks 82*g* and 82*j* stop the display screen support member 81 and the protrusions 81*e* of the display screen support member 81 respectively, whereby the support shafts 82*d* can be more inhibited from coming off the hole portions 81*f*. Thus, the display screen support member 81 and the vertical support members 82 can be further inhibited from disengagement when the display screen support member 81 is anteroposteriorly rotated with respect to the vertical plane.

According to this embodiment, the display screen support member 81 is so rotatably supported in the state held between the hooks 82*g* and 82*j* and the rotational portion mounting portions 82*b* that the same is supported by the vertical support members 82 in the state held between the hooks 82*g* and 82*j* and the rotational portion mounting portions 82b, whereby the display screen support member 81 and the vertical support members 82 can be further inhibited from backlash in the used state of the display screen turning apparatus 20.

According to this embodiment, the upper surfaces 82f of the support shafts 82d, so formed as to come into contact with the bottom portions 81g of the hole portions 81f in the anteroposterior rotational range of the display screen support member 81 with respect to the vertical plane in the used state of the display screen turning apparatus 20, can receive the load of the display screen support member 81 upon rotation thereof, thereby preventing the platelikely extending surfaces of the support shafts 82d from application of the load of the display screen support member 81 through the inner surfaces of the hole portions 81f. Thus, the support shafts 82d can be prevented from breakage.

According to this embodiment, the display screen support member 81 is disengaged from the vertical support members 82 when the surfaces of the support shafts 82d platelikely extending along arrow X1 come into contact with the side surfaces of the hole portions 81f extending along arrow X1 so that the display screen support member 81 and the vertical support members 82 can be disengaged from each other at such an angle that the side surfaces of the sectoral hole portions 81f extending along arrow X1 and the surfaces of the support shafts 82d platelikely extending along arrow X1 are in contact with each other, whereby the position for disengaging the display screen support member 81 and the vertical support members 82 from each other can be clarified dissimilarly to a case of disengaging the display screen support member 81 and the vertical support members 82 from each other at an angle other than the angle at which the side surfaces of the sectoral hole portions 81f extending along arrow X1 and the surfaces of the support shafts 82d platelikely extending along arrow X1 are in contact with each other. Thus, the display screen support member 81 can be easily detached from the vertical support members 82.

According to this embodiment, the platelikely extending surfaces of the support shafts 82d of the vertical support members 82 are so formed as not to come into contact with the side surfaces of the hole portions 81f of the display screen support member 81 in the anteroposterior rotational range of the display screen support member 81 with respect to the vertical plane in the used state of the display screen turning apparatus 20 so that the platelikely extending surfaces of the support shafts 82d of the vertical support members 82 can be prevented from application of force resulting from contact with the side surfaces of the hole portions 81f of the display screen support member 81, whereby the support shafts 82d can be prevented from breakage.

According to this embodiment, the vertical support members 82 are fixed in the state where the platelike support shafts 82d vertically extend so that the platelike support shafts 82d can be regularly fixed in the vertically extending state, whereby the upper surfaces 82f of the support shafts 82d can more reliably receive the load of the display screen support member 81 upon rotation thereof. Thus, the platelikely extending surfaces of the support shafts 82d can be more prevented from application of the load of the display screen support member 81 through the inner surfaces of the hole portions 81f.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus 20 is provided on the liquid crystal television 100 employed as an exemplary television set in the aforementioned embodiment, the present invention is not restricted to this but the display screen turning apparatus 20 may alternatively be provided on another television set having a display screen portion such as an organic EL panel other than a liquid crystal panel.

While the hole portions 81f (receiving hole) are formed on the display screen support member 81 (first support member) and the support shafts 82d and the hooks 82g and 82j (stop portion) are integrally formed on the vertical support members 82 (second support member) in the aforementioned embodiment, the present invention is not restricted to this but a receiving hole may be formed on a second support member while a support shaft and a stop portion may be integrally formed on a first support member, or a receiving hole and a stop portion may be integrally formed on either a first support member or a second support member while a support shaft may be integrally formed on either the second support member or the first support member.

While the hooks 82g and 82j are integrally formed on the vertical support members 82 in the aforementioned embodiment, the present invention is not restricted to this but a stop portion may be provided independently of a first or second support member.

While the display screen support member 81 and the vertical support members 82 are made of sheet metal in the aforementioned embodiment, the present invention is not restricted to this but the material for first and support members is not restricted to sheet metal, so far as these members are made of metal.

While the pairs of hooks 82g and 82j are formed on the vertical support members 82 to hold the support shafts 82d therebetween in the aforementioned embodiment, the present invention is not restricted to this but one or at least three stop portions may be formed on each second support member.

While the rack gear 63 provided on the upper surface of the plate member 61 and the rotational gear 83 provided on the lower surface portion 81i of the display screen support member 81 are employed in order to anteroposteriorly rotate the television body 10 (display screen portion) by a prescribed angle with respect to the vertical plane in the aforementioned embodiment, the present invention is not restricted to this but a display screen portion may be anteroposteriorly rotated by a prescribed angle with respect to a vertical plane by rotatably fixing the upper surface of a plate member and the lower surface of a display screen support member with a pin member or the like.

While the stepping motors 42 and 52 are provided as the driving sources of the horizontal and vertical turning/driving portions 40 and 50 respectively in the aforementioned embodiment, the present invention is not restricted to this but one driving source may drive both of horizontal and vertical turning/driving portions.

What is claimed is:
1. A display screen turning apparatus comprising:
a first support member of metal supporting a display screen portion; and
a second support member of metal supporting said first support member to be anteroposteriorly rotatable by a prescribed angle with respect to a vertical plane, wherein
either said first support member or said second support member has a receiving hole, while either said second support member or said first support member integrally has a support shaft made of a plate of metal inserted into said receiving hole, and either said first support member or said second support member integrally has a stop portion for inhibiting said support shaft from coming off said receiving hole in the anteroposterior rotational range of said first support member with respect to said vertical plane in the used state of said apparatus when said support shaft is inserted into said receiving hole, and said support shaft made of a plate and said stop portion are in one continuous piece with either said first support member or said second support member.

2. The display screen turning apparatus according to claim 1, wherein said first support member has said receiving hole and said second support member integrally has said support shaft and said stop portion, and said second support member is disengaged from said first support member when said first support member is rotated beyond the anteroposterior rotational range of said first support member with respect to said vertical plane in the used state of said apparatus.

3. The display screen turning apparatus according to claim 2, wherein said second support member is made of sheet metal, and said support shaft and said stop portion are integrally formed on said second support member by bending.

4. The display screen turning apparatus according to claim 2, wherein said stop portion consists of a first stop portion and a second stop portion, and said first support member further has a notched portion for separating said first stop portion from said first support member when rotated up to a position where said second support member is disengaged from said first support member.

5. The display screen turning apparatus according to claim 4, wherein said first support member further has a stop section stopped by said second stop portion, and said second stop portion stops said stop section in the anteroposterior rotational range of said first support member with respect to said vertical plane in the used state of said apparatus.

6. The display screen turning apparatus according to claim 5, so formed as to disengage said stop section and said second stop portion from each other when rotating said first support member beyond the anteroposterior rotational range of said first support member with respect to said vertical plane in the used state of said apparatus.

7. The display screen turning apparatus according to claim 5, wherein said first support member is made of sheet metal, and said stop section is integrally formed on said first support member.

8. The display screen turning apparatus according to claim 4, wherein said first stop portion has a stop section extending toward said support shaft, said notched portion is so formed as to extend toward said receiving hole, and said stop section is so formed as to stop said first support member in the anteroposterior rotational range of said first support member with respect to said vertical plane in the used state of said apparatus when said support shaft is inserted into said receiving hole and to be separable from said notched portion when said first support member is rotated up to a position where said second support member is disengaged from said first support member.

9. The display screen turning apparatus according to claim 5, so formed that said first stop portion stops said first support member and said second stop portion stops said stop section in the anteroposterior rotational range of said first support member with respect to said vertical plane in the used state of said apparatus when said support shaft is inserted into said receiving hole.

10. The display screen turning apparatus according to claim 9, wherein said second support member further has a body portion provided with said support shaft on a substantially central portion and provided with said first stop portion and said second stop portion on the side surface, and said first support member is rotatably supported in a state held between said first and second stop portions and said body portion.

11. The display screen turning apparatus according to claim 2, wherein said support shaft made of a plate is so formed on said second support member as to vertically extend, while said receiving hole of said first support member is so formed as to substantially vertically receive an extending surface of said support shaft made of a plate, and the upper surface of said support shaft is so formed as to come into contact with the bottom portion of said receiving hole in the anteroposterior rotational range of said first support member with respect to said vertical plane in the used state of said apparatus.

12. The display screen turning apparatus according to claim 2, wherein said receiving hole has a sectoral shape, and said first support member is so formed that said second support member is disengaged from said first support member when an extending surface of said support shaft made of a plate comes into contact with at least one side surface of said receiving hole.

13. The display screen turning apparatus according to claim 2, wherein an extending surface of said support shaft made of a plate of said second support member is so formed as not to come into contact with the side surface of said receiving hole of said first support member in the anteroposterior rotational range of said first support member with respect to said vertical plane in the used state of said apparatus.

14. The display screen turning apparatus according to claim 11, wherein said second support member is fixed in a state where said support shaft made of a plate vertically extends.

15. A television set comprising:

a display screen portion displaying a television image;

a first support member of metal supporting said display screen portion; and a second support member of metal supporting said first support member to be anteroposteriorly rotatable by a prescribed angle with respect to a vertical plane, wherein either said first support member or said second support member has a receiving hole, while either said second support member or said first support member integrally has a support shaft made of a plate of metal inserted into said receiving hole, and either said first support member or said second support member integrally has a stop portion for inhibiting said support shaft from coming off said receiving hole in the anteroposterior rotational range of said first support member with respect to said vertical plane in the used state of said apparatus when said support shaft is inserted into said receiving hole, and said support shaft made of a plate and said stop portion are in one continuous piece with either said first support member or said second support member.

16. The television set according to claim 15, wherein said first support member has said receiving hole and said second support member integrally has said support shaft and said stop portion, and said second support member is disengaged from said first support member when said first support member is rotated beyond the anteroposterior rotational range of said first support member with respect to said vertical plane in the used state of said apparatus.

17. The television set according to claim 16, wherein said second support member is made of sheet metal, and said support shaft and said stop portion are integrally formed on said second support member by folding.

18. The television set according to claim 16, wherein said stop portion consists of a first stop portion and a second stop portion, and said first support member further has a notched portion for separating said first stop portion from said first support member when rotated up to a position where said second support member is disengaged from said first support member.

* * * * *